United States Patent
Nakamura et al.

(10) Patent No.: US 7,317,043 B2
(45) Date of Patent: Jan. 8, 2008

(54) IMPACT MODIFIER, PROCESS FOR PRODUCING THE SAME, AND THERMOPLASTIC RESIN COMPOSITION

(75) Inventors: Keiji Nakamura, Hiroshima (JP); Kimihiko Hattori, Hiroshima (JP); Masahiro Osuka, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 134 days.

(21) Appl. No.: 10/504,334

(22) PCT Filed: Feb. 26, 2003

(86) PCT No.: PCT/JP03/02126

§ 371 (c)(1),
(2), (4) Date: Sep. 17, 2004

(87) PCT Pub. No.: WO03/072621

PCT Pub. Date: Sep. 4, 2003

(65) Prior Publication Data

US 2005/0239949 A1    Oct. 27, 2005

(30) Foreign Application Priority Data

Feb. 27, 2002 (JP) .............. 2002-051292
May 30, 2002 (JP) .............. 2002-157310

(51) Int. Cl.
*C08F 9/06* (2006.01)
(52) U.S. Cl. ............ 523/201; 525/227; 525/225; 525/309
(58) Field of Classification Search ........ 523/201; 525/71, 80, 85, 227, 225, 309, 79
See application file for complete search history.

(56) References Cited

U.S. PATENT DOCUMENTS

| | | | |
|---|---|---|---|
| 5,120,788 A | 6/1992 | Seitz et al. | |
| 5,169,903 A | 12/1992 | Toritani et al. | |
| 5,338,804 A | 8/1994 | Toritani et al. | |
| 6,235,839 B1 | 5/2001 | Guentherberg et al. | |
| 6,486,234 B1 * | 11/2002 | Nakamura et al. | 523/201 |
| 6,833,409 B2 * | 12/2004 | Nakamura et al. | 525/71 |
| 2003/0114588 A1 | 6/2003 | Nakamura et al. | |

FOREIGN PATENT DOCUMENTS

| | | |
|---|---|---|
| EP | 279572 A2 * | 8/1988 |
| EP | 0 872 519 A1 | 10/1998 |
| EP | 1 106 649 A1 | 6/2001 |
| GB | 1337 618 | 11/1973 |
| JP | 51-129487 | 11/1976 |
| JP | 5-345812 | 12/1993 |
| JP | 2000-198905 | 7/2000 |
| JP | 2001-288354 | 10/2001 |
| WO | WO 99/31154 | 6/1999 |

OTHER PUBLICATIONS

U.S. Appl. No. 10/504,334, filed Aug. 25, 2004, Nakamura et al.

* cited by examiner

*Primary Examiner*—Robert D. Harlan
(74) *Attorney, Agent, or Firm*—Oblon, Spivak, McClelland, Maier & Neustadt, P.C.

(57) ABSTRACT

There is disclosed an impact modifier which comprises a graft copolymer comprising a rubber polymer (A) obtained from a mixture of one or more kinds of (meth)acrylic monomers as major ingredients, having a glass transfer temperature of 0° C. or lower, and forming particles having each of 80 wt % or more of them has a particle diameter within the range of 400 to 1,000 nm as determined from a particle diameter distribution on a weight basis, and branches (B) grafted thereto obtained from one or more kinds of vinyl monomers; a process for producing thereof; and a thermoplastic resin composition containing the impact modifier.

31 Claims, 3 Drawing Sheets

IMPACT MODIFIER, PROCESS FOR PRODUCING THE SAME, AND THERMOPLASTIC RESIN COMPOSITION

TECHNICAL FIELD

The present invention relates to an impact modifier which is capable of providing excellent weather resistance and coloringability, to a process for producing the impact modifier, and to a thermoplastic resin composition containing the impact modifier.

BACKGROUND ART

For multipurpose thermoplastics such as ABS resin, polycarbonate resin, polyester resin, polystyrene, and acrylic resin, it has been known how to improve impact resistance, weather resistance, pigment coloringability, and pyrolysis resistance.

For example, JP-B-4-325542 describes a method of improving appearance of a product without deterioration of the impact resistance by adding specific alcohol to a rubber polymer latex. JP-A-10-101869 describes a method of improving impact resistance of the multipurpose thermoplastics by adding graft copolymers obtained by graft polymerization of vinyl monomers to composite rubbers having inseparable structures comprising isobutylene polymer segments and vinyl polymer segments.

There is a method of improving impact resistance of the thermoplastic by adding a resin as a modifier obtained by graft polymerization of methyl methacrylate, styrene, acrylonytrile, and the like to butadiene rubber polymer, for example, MBS (Methylmethacrylate-Butadiene-Styrene) resin and the like. However, the weather resistance tends to be reduced when the MBS resin is added, and the impact resistance tends to be reduced rapidly as time passes when a molded article made of the thermoplastic containing it is used outdoors. It is considered that one of the major causes of the deterioration of the weather resistance is due to degradations of butadiene units in the MBS resin by ultraviolet light.

JP-B-51-28117 describes a method of improving the weather resistance and the impact resistance by using a graft copolymers obtained by graft polymerization of methyl methacrylate, styrene, acrylonytrile, and the like to crosslinked alkyl (meth) acrylate rubber polymer obtained by alkyl (meth) acrylate monomers and crosslinking agents. However, the coloringability such as the pigment coloringability of the graft polymer tends to be lower than that of the MBS resin due to refractive indexes of acrylic resins and so on.

JP-A-2001-31830 describes a thermoplastic resin composition having improved coloringability, weather resistance, and impact strength by controlling particle diameter of polymer. Especially, it is described that color of the composition tends to be improved when rubber particle diameter of an impact modifier becomes smaller and MBS resin may be added to also improve the impact resistance. However, the polymer isn't used for matrix resin.

JP-A-2000-26552 describes an impact modifier using original acrylic composite rubber, and JP-A-2000-319482 describes an impact modifier using acrylic composite rubber having specific particle diameter distribution. These modifiers can improve the impact resistance. However, these don't describe general material properties especially required for engineering plastics such as coloringability which affects appearance and recyclingability. And, at present, demanded properties are higher than those of the modifiers.

As for the method of providing balanced weather resistance, coloringability, and impact resistance on high levels, there is ample scope for improvement when prior arts are adopted. For example, to skip coating of housing material for automobile or OA equipment, a method of providing balanced coloringability, especially ebonyty in dark colors impact resistance, and weather resistance on high levels at the same time is one of the most demanded technologies at present.

DISCLOSURE OF INVENTION

A purpose of the present invention is to provide an impact modifier having balanced material properties on high levels, which improves the impact resistance of resins by adding a small amount of it, which maintains weather resistance, pigment coloringability, heat resistance in humid atmosphere, and heat transformation resistance of the resins very well, and which doesn't cause poor flame retardationability to the resins when flame retardants are added for flame retardation uses of them.

One embodiment of the present invention provides an impact modifier which comprises a graft copolymer comprising: a rubber polymer (A) obtained from a mixture of one or more kinds of (meth)acrylic monomers as major ingredients, having a glass transfer temperature of 0° C. or lower, and forming particles having each of 80 wt % or more of them has a particle diameter within the range of 400 to 1,000 nm as determined from a particle diameter distribution on a weight basis; and branches (B) grafted thereto obtained from one or more kinds of vinyl monomers.

One embodiment of the present invention provides a process for producing the impact modifier comprising two or more processes of polymerization for the rubber polymer (A).

One embodiment of the present invention provides a thermoplastic resin composition comprising the impact modifier.

Within the context of the present invention, when the term "(meth)acrylic" is used in the present specification, it means "acrylic or methacrylic", and when the term "(meth)acrylate" is used in the present specification, it means "acrylate or methacrylate".

BEST MODE FOR CARRYING OUT THE INVENTION

Figure 1:
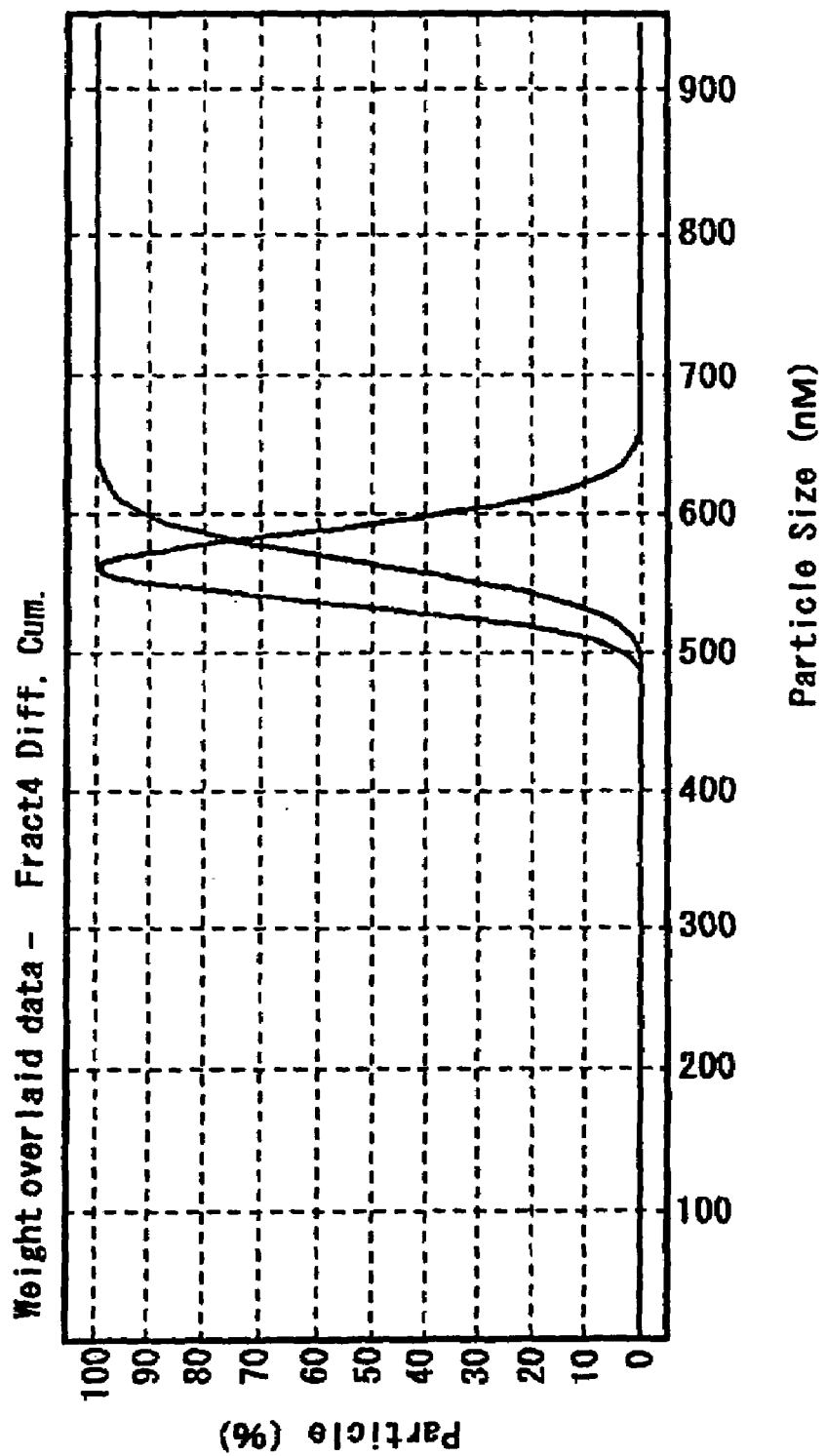
FIG. 1 provides a graph showing a particle size distribution on a weight basis of rubber polymer (A) obtained by Production Example 1-1.

The rubber polymer (A) used in the present invention is obtained from a mixture of one or more kinds of (meth) acrylic monomers as major ingredients. The kinds of (meth) acrylic monomers are not subjected to any restriction, but generally, (meth)acrylate is used.

The specific examples of the (meth)acrylate include methyl acrylate, ethyl acrylate, n-propyl acrylate, n-butyl acrylate, 2-ethylhexyl acrylate, octyl acrylate, tridecyl acrylate, ethoxyethixyethyl acrylate, methoxytripropyleneglycol acrylate, 4-hydroxybutyl acrylate, lauryl acrylate, lauryl methacrylate, stearyl methacrylate, and the like. These monomers may be used either singly or as mixture of two or more of them.

It is preferred that the glass transfer temperature of the rubber polymer (A) is 0° C. or lower. It tends to provide excellent impact resistance. In this respect, it is preferred to use alkyl (meth)acrylate such as n-butyl acrylate, 2-ethylhexyl acrylate, octyl acrylate, lauryl acrylate, tridecyl acrylate, lauryl methacrylate, and tridecyl methacrylate to obtain the rubber polymer (A). When (meth)acrylate which is crystallized around room temperature such as stearyl methacrylate is used, it is preferred to be mixed with monomers which can dissolve it.

The rubber polymer (A) is especially preferred to be a composite rubber which can provide more excellent impact resistance at low temperature though it may be a polymer or copolymer which is simply obtained by polymerization of one or more kinds of monomers.

Prefer examples of the composite rubber include a composite rubber comprises, as a principal component, an acrylic rubber (A1) component and an acrylic rubber (A2) component. The acrylic rubber (A1) component contains, as a constituent component, at least one of a (meth)acrylate of an alcohol having a branched side chain or an alcohol having an alkyl group with 13 or more carbon atoms, or at least one of a (meth)acrylate having a hydroxyl group, a methoxy group, or an ethoxy group. The acrylic rubber (A2) component contains n-butyl acrylate as a constituent component. A glass transition temperature (Tg1) comes from the acrylic rubber (A1) component is preferred to lower than a glass transition temperature (Tg2) comes from the acrylic rubber (A2) component. The composite rubber like this example tends to provide higher impact resistance at low temperature than the rubber which is simply obtained by copolymerization of monomers.

Preferred examples of the acrylic rubber (A1) component include 2-ethylhexyl acrylate, ethoxyethyl acrylate, methoxytripropylene glycol acrylate, 4-hydroxybutyl acrylate, tridecyl methacrylate, tridecyl acrylate, stearyl methacrylate, and stearyl acrylate.

The composite rubber usually comprises the acrylic rubber (A1) component which is within a range from 5 to 95% by weight and the acrylic rubber (A2) component which is within a range from 95 to 5% by weight. The preferred range of the acrylic rubber (A1) component is from 10 to 90% by weight and that of the acrylic rubber (A2) component is from 90 to 10% by weight. The more preferred range of the acrylic rubber (A1) component is from 20 to 80% by weight and that of the acrylic rubber (A2) component is from 80 to 20% by weight. To obtain properties superior to the copolymerized rubber, it is effective for the composite rubber to have the above-mentioned composition.

Monomer components to obtain the rubber polymer (A) usually contain monomers having two or more unsaturated bonds in the molecule of each of them. The quantity of the monomers in the components is preferred to be 2% by weight or less. The more preferred quantity is 1.5% by weight or less. These monomers work as crosslinking agents or graft cross agents.

Examples of the crosslinking agent include ethylene glycol dimethacrylate, propylene glycol dimethacrylate, 1,3-butylene glycol dimethacrylate, 1,4-butylene glycol dimethacrylate, divinylbenzene, and silicone such as polyfunctional methacrylic group-modified silicone.

Examples of the graft cross agent include allyl methacrylate, triallyl cyanurate, triallyl isocyanurate and the like. Allyl methacrylate can also be used as the crosslinking agent. These crosslinking agents and graft cross agents may be used either singly or as a mixture of two or more of them.

When the composite rubber is used as the rubber polymer (A), it is preferred that the quantity (% by weight) of the crosslinking agents or a graft cross agents in the (A2) component is more than that of the (A1) component.

It is preferred that the rubber polymer (A) has two or more glass transition temperatures at 10° C. or lower. Further, it is preferred that the glass transition temperature (Tg1) come from the acrylic rubber (A1) component is lower than the glass transition temperature (Tg2) come from the acrylic rubber (A2) component.

When these glass transition temperatures meet this condition, the obtained impact strength modifier exhibits higher impact resistance. It is a typical characteristic derived from the composite rubber, and on this point, it can be distinguished from the copolymer simply obtained by polymerization.

The glass transition temperature of the polymer is measured as a transition point of Tan δ which is measured by a dynamic mechanical properties analyzer (hereinafter referred to as DMA) Generally, the polymer obtained from the monomer has an intrinsic glass transition temperature and one transition point was observed in the case of a homopolymer (random copolymer composed of a single of plural components), while plural intrinsic transition points are observed in case of a mixture composed of plural components, or a composite polymer. If the polymer is composed of two components, two transition points are observed by the measurement. Although two peaks are observed in the Tan δ curve measured by DMA, the respective peaks are near to with each other and are sometimes observed as a peak with a shoulder if the two components drastically differ in composition ratio and have almost the same transition temperature. However, it can be differentiated from a simple one-peak curve.

When the rubber polymer (A) is copolymerized, a mixture of the (math)acrylic monomers and other monomers can be used. Examples of the other monomers include aromatic alkenyl compounds such as styrene, α-methylstyrene, or vinyl toluene; cyanated vinyl compounds such as acrlonitrile or methacrylonitrile; silicon-containing monomers having one or more methacrylic acid groups; and vinyl compounds containing one or more fluorine atoms. The preferred quantity of the other monomers in the mixture is 30% by weight or less.

In the present invention, the particle diameter distribution of the rubber polymer (A) is a result of measurement by Capillary Hydro Dynamic Flow Fractionation (hereinafter referred to as CHDF). The CHDF is one of the methods for measuring diameters of particles and diameter distribution of the particles, and it is one of the methods for measuring them which is generally applied to a emulsified latex, a particles-dispersed suspension, and the like. In this specification, values of the diameters of particles and the diameter distribution of the particles are based on the measurement by the CHDF.

In the present invention, the rubber polymer (A) forms particles having particle diameters within the range of 400 to 1,000 nm based on a particle diameter distribution measured by the CHDF. When the lower limit of the range is less than 400 nm, the impact strength of the thermoplastic resin composition containing it tends to be decreased due to aggregation of the impact strength modifier in a matrix resin especially containing two or more kinds of resins which are alloyed. When the upper limit of the range is more than 1000 nm, the impact strength of the thermoplastic resin composition also tends to be decreased. In the present invention, it is preferred for the rubber polymer (A) to form particles having each of 90 wt % or more of them has a particle diameter within the range of 400 to 1,000 nm. It is more preferred that all of the particles have diameters within the range. It is preferred for the rubber polymer (A) to form particles having each of 80 wt % or more of them has a particle diameter within the range of 400 to 800 nm. The more preferred range is from 400 nm to 700 nm.

In particle diameter groups from the particle diameter distribution of the rubber polymer (A) measured by the CHDF having peak values of diameter within the range of 400 to 1,000 nm, it is preferred that the heaviest group forms 70% by weight or more of the gross weight of the groups.

When some restrictions of industrial production are considered, it is preferred for the rubber polymer (A) to have the heaviest group which forms 90% by weight or more of the gross weight of the groups. It tends to afford well-balanced properties to the rubber polymer (A).

When the rubber polymer (A) comprises particles and each of 80 wt % or more of them has a particle diameter within the range of 400 to 1,000 nm based on a particle diameter distribution on a weight basis measured by the CHDF, and when difference between the diameter correspond to 85% of cumulative distribution from the smallest particle diameter on a weight basis (d85) and the diameter correspond to 15% of it (d 15) is defined as d(=d85−d15), it is preferred that the value of d is 180 nm or less.

In particle diameter groups from the particle diameter distribution of the rubber polymer (A) measured by the CHDF having peak values of diameter within the range of 400 to 1,000 nm, it is preferred that the heaviest group forms 70% by weight or more of the gross weight of the groups.

The particle diameter distribution of the rubber polymer (A) can be measured by methods known in public. For example, detail of the particle diameter distribution can be known when a particle diameter distribution analyzer by the above-mentioned CHDF is used and a graph of the diameter distribution is drawn.

Though the method of producing the rubber polymer (A) is not particularly restricted, for example, it can be obtained when the (meth)acrylic monomers or mixtures containing them are polymerized by an emulsion polymerization method, a suspension polymerization method, and the like. Generally, it is said that particle diameters of the rubber polymer (A) obtained by the emulsion polymerization method tends to be larger and the particle diameter by the suspension polymerization method tends to be smaller. For example, the rubber polymer (A) having the above-mentioned particle diameter distribution can be obtained by using polymerization initiator such as potassium persulfate and the like without emulsifier. Around a neutral atmosphere, preferably under an atmosphere of pH6 or more, when potassium persulfate is used as the initiator, sulfate ion radical forms from potassium persulfate. And sulfates are bonded as terminal groups of the obtained polymer.

It is preferred that the rubber polymer (A) having the above-mentioned particle diameter distribution is obtained by multi-stage polymerization. It is more preferred that the first stage comprises a polymerization process without using an emulsifier which makes the particle diameters increased and rate of polymerization lower and that the stage after the first comprises a polymerization process with an emulsifier. It tends to make time for polymerization shorter and prevent production of cullet during the polymerization.

It is preferred to add the emulsifier two or more times separately in the stage after the first when the multi-stage polymerization is applied to obtain the rubber polymer (A).

It is also preferred that a mixture of the emulsifier, the monomers, and pure water is added into a reactor to obtain the rubber polymer (A).

The rubber polymer (A) can be obtained by a conventional emulsion polymerization method which doesn't have a process without using an emulsifier. When this method is used, it is better that the polymerization is divided into several stages to make the particle diameters increased. It tends to be difficult to obtain the particles having the above-mentioned diameters when a method having only one polymerization stage is used.

In the first stage of the polymerization divided into several stages, it is preferred that 0.5 parts by weight or less of the emulsifier is used for 100 parts by weight of the monomers which is the total amount of the whole stages. The more preferred range is 0.2 parts by weight or less. The much more preferred range is 0.1 parts by weight or less. The most preferred range is 0.05 parts by weight or less. When these small amounts of the emulsifier are applied, it tends to prevent the particle diameters from being too small, shorten a process of seed polymerization in the later stage, prevent excessive emulsifier from forming new particles, and become easier to obtain the above-mentioned particle diameter.

It is preferred to obtain the rubber polymer (A) by seed polymerization rather than using a growing agent or a coagulating agent to make the particle diameter increased.

It is preferred to make the amount of monomers used in the first stage as small as possible. Specifically, it is preferred that 20 parts by weight or less of the monomers is used for 100 parts by weight of the monomers which is the total amount of the whole stages. The more preferred range is 10 parts by weight or less. When these small amounts of the monomers are applied, it tends to become easier to obtain the above-mentioned particle diameter.

When the rubber polymer (A) is the composite rubber which comprises, as a principal component, the acrylic rubber (A1) component containing at least one compound which is selected from the group consisting of 2-ethylhexyl acrylate, ethoxyethyl acrylate, methoxytripropylene glycol acrylate, 4-hydroxybutyl acrylate, tridecyl methacrylate, tridecyl acrylate, stearyl methacrylate, and stearyl acrylate, and the acrylic rubber (A2) component containing n-butyl acrylate as a constituent component, it is preferred that there is a forced emulsification treatment process especially in the polymerization of the (A1) component. This process is effective when generation of scale or reduction of the rate of polymerization is occurred, and especially when some kinds of monomers which are not easy to polymerize in the emulsion are used. Concretely, monomer mixture for the (A1) component is emulsified preparatorily by an apparatus such as in-line mixer and dispersed by an apparatus for forced emulsification such as homogenizer which can apply pressure of 5 MPa or more to it. It is estimated that average particle diameter of the monomer mixture is from about 0.1 μm to about 10 μm after this treatment.

The impact modifier of the present invention having the specific particle diameter can be obtained by polymerization of the forced emulsified monomer mixture. It is preferred that this polymerization has two or more separated steps.

The generation of the scale can be decreased and an efficient process cycle can be realized by this method.

It is preferred that all of raw materials which constitute the (A2) component are added to the (A1) component at the same time and these are polymerized after some catalysts are added.

It is not preferred to use polymer particles having acid or salt groups though it is relatively easy for them to make the particle size larger, because to obtain the specific particle diameter distribution of the present invention tends to be difficult, and because the properties of the matrix resins tend to be degraded when the polymer particles are used as a growing agent.

When the rubber polymer (A) is produced, known surfactants such as anionic surfactants, nonionic surfactants, and cationic surfactants can be used as the emulsifier and dispersion stabilizer. If necessary, a mixture thereof can be used.

Acrylic rubber graft copolymer comprising the rubber polymer (A) and the branches (B) can be obtained when one or more kinds of vinyl monomers are grafted by polymerization with the rubber polymer (A).

The vinyl monomers to obtain the branches (B) can be selected reasonably. Specific examples of the monomers include aromatic alkenyl compounds such as styrene, α-methylstyrene, and vinyl toluene; methacrylate such as methyl methacrylate, and 2-ethylhexyl methacrylate; acrylate such as methyl acrylate, ethyl acrylate, and n-butyl acrylate; and cyanated vinyl compound such as acrlonitrile and methacrylonitrile. One or more kinds of these vinyl monomers can be used.

It is preferred for the vinyl monomers to contain vinyl monomers having two or more unsaturated bonds in the molecule of each of them when the impact resistance and the heat resistance are taken into consideration. Specific examples include monomers which work as crosslinking agent such as ethylene glycol dimethacrylate, propylene glycol dimethacrylate, 1,3-butylene glycol dimethacrylate, 1,4-butylene glycol dimethacrylate, divinylbenzene, and silicone such as polyfunctional methacrylic group-modified silicone and the like; and which work as crosslinking agents and/or graft cross agents such as allyl methacrylate, triallyl cyanurate, triallyl isocyanurate and the like. The quantity of the monomers in the vinyl monomers to obtain the branches (B) is preferred to be 20% by weight or less.

The branches (B) can be obtained by single- or multi-stage polymerization. Though the impact resistance may be changed by properties of the impact modifier such as dispersibility and surface strength in the matrix, the impact resistance tends to be improved when it is obtained by the multi-stage polymerization. For example, when the branches (B) contains reactive monomer units such as glycidyl methacrylate, the multi-stage polymerization is an effective way to keep reactivity of glycidyl methacrylate and the dispersibility. However, excessive stages increase the processes and reduce productivity. It is preferred that the multi-stage polymerization has five or less stages. It is more preferred to be three or less stages.

The branches (B) may be obtained by droplet polymerization which is generally used. However, when the rubber polymer (A) is obtained by the multi-stage polymerization having a process without using an emulsifier as the first stage polymerization, it is preferred that all of raw materials which constitute the branches (B) are added to the rubber polymer (A) at the same time and polymerized after some catalysts are added. By this process, fusing of coagulated particles can be avoided when the polymerized particles are collected as powder.

In each of the second or the later stage, the both of the above-mentioned way to add the raw materials are acceptable.

With respect to the proportion of the rubber polymer (A) to the branches (B) in the graft copolymer, the amount of the rubber polymer (A) is preferably within a range from 80 to 99 parts by weight when the sum of them is 100 parts by weight, more preferably from 80 to 95% by weight, much more preferably from 80 to 90% by weight. When the amount of the branches (B) is 1 part by weight or more, the dispersibility of the obtained graft copolymer in resin tends to be improved. When the amount of the branches (B) is 20 parts by weight or less, the property to provide high impact strength tends to be improved.

In the present invention, it is preferred that one or more kinds of monomer units which are derived from vinyl monomers having one or more functional groups selected from the group consisting of epoxy group, hydroxyl group, and isobornyl group are components of the rubber polymer (A) and/or the branches (B). It tends to make the properties of the modifier such as pigment coloringability and heat transformation resistance improved more. Though the best quantity of the monomer units having the functional groups may be changed by the matrix resin which is the subject for the modifier, it is preferred to be 50 wt % by weight or less in the rubber polymer (A) or the branches (B) when the impact resistance is taken into consideration. And it is preferred to be 0.01 wt % by weight or more in it when the pigment coloringability and the heat transformation resistance are taken into consideration. It is more preferred to be 0.05 wt % by weight or more.

In the impact modifier of the present invention, compound (R) having sulfonic acid group, sulfosuccinic acid group, or sulfuric acid group, or the salt of the compound (R) can be contained. It is preferred that the compound (R) has one or more phenyl skeletons. The impact strength is improved more by using the compound (R) or the salt of it. They can be added to the graft copolymer, and they can be added in any steps of the process to produce the graft copolymer. For example, they can be used as emulsifiers for the emulsion polymerization to produce the graft copolymer.

When a kind of sulfonic acid having two phenyl groups in one molecular or a salt obtained by neutralization of it is contained in resins, heat stability of the resins in molding is improved. The sulfonic acid having one or more phenyl groups in one molecular or the salt of it may be alkyl phenyl-type or alkyl phenyl ether-type, and may be contain polyoxyethylene chain which is nonion. These compounds may be used either singly or as a mixture of two or more of them. Especially, salt of alkyl diphenyl ether disulfonic acid such as sodium alkyl diphenyl ether disulfonate is preferred.

The quantity of the compound (R) or the salt in the impact modifier is preferred to be within the range of 0.1 to 100,000 ppm when the impact resistance of the resin composition is taken into consideration. The more preferred range is from 0.1 to 10,000 ppm. The much more preferred range is from 0.5 to 5,000 ppm.

When the compound (R) or the salt has emulsifiability, it can be used as an emulsifier as mentioned above. When a coagulating agent is used, it is acceptable to use the compound (R) or the salt whose counter ion is different. When spray-drying is applied, substantially whole quantity of the compound (R) or the salt to obtain the impact modifier remains in it. When the compound having one or more phenyl skeleton which is mentioned above and carbonic acid-type emulsifier which can be optionally used are applied as emulsifiers for the polymerization, both of the polymerization stability and the heat resistance in humid atmosphere are improved.

As a component of the impact modifier of the present invention, a compound having one or more structures which are selected from the group consist-ing of mercapto group, sulfuric acid group, ammonium group, and calcium atom can be used. There is no specific restriction against origins of them. They may be existed in the emulsifier, and they may be existed in a molecular chain which constitutes the impact modifier. In this case, the impact resistance is improved more.

When the impact modifier contains calcium, the impact resistance, the weather resistance, and the heat resistance in humid atmosphere tend to be improved. To obtain this result, the quantity of calcium is preferred to be within the range of 0.0001 parts by weight (1.0 ppm) to 10 parts by weight when the sum of the impact modifier is 100 parts by weight. There is no specific restriction against origins of calcium.

When the obtained graft copolymer is collected as powder by wet coagulation, calcium salt is preferred to be used as a coagulating agent.

Inorganic filler (C) is preferred to be contained in the impact modifier of the present invention. It makes the heat transformation resistance improved more. The kind or the amount of the inorganic filler (C) is not subjected to any specific restrictions. When some heat transformation resistance is needed, it can be determined properly. Specific examples the inorganic filler (C) includes carbonate such as heavy calcium carbonate, precipitated calcium carbonate, and gelatinous calcium carbonate; titanium oxide, clay, talc, mica, silica, carbon black, graphite, glass beads, glass fiber, carbon fiber, and metal fiber. Water -soluble fillers or suspension fillers can be used. By the combination of the inorganic filler (C) and the graft copolymer, both of the heat transformation resistance and the above-mentioned properties can be excellent.

The inorganic filler (C) can be added to the graft copolymer latex directly. It can also be added when the graft copolymer is collected as powder or when the graft copolymer is pelletized.

The quantity of inorganic filler (C) is preferred to be within the range of 0.01 parts by weight to 30 parts by weight when the graft copolymer is 100 parts by weight. The more preferred range is from 0.01 parts by weight to 20 parts by weight. The much more preferred range is from 0.01 parts by weight to 10 parts by weight. The most preferred range is from 0.01 parts by weight to 5 parts by weight. The lower limits of these ranges are related to the heat resistance. The upper limits of these ranges are related to the impact resistance.

When the above-mentioned graft polymerization is finished, the graft copolymer comprising the rubber polymer (A) and the branches (B) is obtained as latex. In the present invention, the graft copolymer obtained as latex is preferred to be collected as powder or granules by the process of spray-drying or the wet coagulation which uses acids or salts. However, when the graft copolymer has functional groups, it is not preferred to apply the wet coagulation by acids. This is because, when acids are used, it tends to deactivate or contaminate the functional groups. When the wet coagulation by salt is applied, it is preferred to use alkaline earth metals salt such as calcium acetate, calcium chloride, and magnesium sulfate. When alkaline earth metal is used, deterioration of the heat resistance in humid atmosphere which is oriented to recyclingability, namely deterioration such as decomposition of the matrix resin by moisture and heat, can be avoided very well.

Spray-drying which doesn't use salts for coagulating agents is preferable as a process for collection which is oriented to the recyclingability. When this process is applied, not only the graft copolymer but also fillers and/or other kinds of polymers can be sprayed at the same time and powder containing all of them is collected. When the kind of the materials for spraying is selected properly, the power having more preferable handringability can be obtained. The specific example of the components for the spraying include the above-mentioned calcium compound, silica, hard vinyl copolymer, and the like.

Usually, the impact modifier of the present invention is added to the thermoplastic resin. In other words, the thermoplastic resin composition of the present invention is a composition comprising the thermoplastic resin and the impact modifier of the present invention as major components. The quantity of the impact modifier in the composition is not subjected to any restrictions, but it is preferred to be within the range of 1 to 40 parts by weight when the thermoplastic resin is 100 parts by weight. The more preferred range is from 1 to 20 parts by weight.

Specific examples of the thermoplastic resin include olefin resin such as polypropylene (PP), and polyethylene (PE); styrene resin (St resin) such as polystyrene (PS), high-impact polystyrene (HIPS), (meth)acrylate-styrene copolymer (MS), styrene-acrylonitrile copolymer (SAN), styrene-maleic anhydride copolymer (SMA), acrylonitrile-butadiene-styrene copolymer (ABS), acrylonitrile-styrene-acrylate copolymer (ASA), and acrylonitrile-EPDM-styrene copolymer (AES); acrylic resin (Ac resin) such as methyl polymethacrylate (PMMA); polycarbonate resin (PC resin); polyamide resin (PA resin); polyester resin (PEs resin) such as polyethylene terephthalate (PET) and polybutylene terephthalate (PBT); engineering plastics such as (modified) polyphenylene ether resin (PPE resin), polyoxymethylene resin (POM resin), polysulfon resin (PSO resin), polyarylate resin (PAr resin), polyphenylene resin (PPS resin), and thermoplastic polyurethane resin (PU resin); thermoplastic elastomer (TPE) such as styrene elastomer, olefin elastomer, vinyl chloride elastomer, urethane elastomer, polyester elastomer, polyamide elastomer, fluorine elastomer, 1,2-polybutadiene, and trans 1,4-polyisoprene; polymer alloy, for example, PC resin/St resin alloy such as PC/ABS; PVC resin/St resin alloy such as PVC/ABS; PA resin/St resin alloy such as PA/ABS; PA resin/TPE alloy; PA resin/polyolefin resin alloy such as PA/PP; PC resin/PEs resin alloy such as PBT resin/TPE and PC/PBT; alloy of olefin resins, such as polyolefin resin/TPE and PP/PE; PPE resin alloy such as PPE/HIPS, PPE/PBT, and PPE/PA; PVC resin/Ac resin alloy such as PVC/PMMA; and vinyl chloride resin such as rigid vinyl chloride resin, semi-rigid vinyl chloride resin, and soft vinyl chloride resin.

Among them, polycarbonate resin, polyester resin, styrene resin, acrylic resin, polyamide resin, and vinyl chloride resin are preferred. Especially, polycarbonate resin, polyester resin, and ABS resin are more preferred.

When flame retardancy is required to the thermoplastic resin composition of the present invention, flame retardants can be added to it. Especially, halogen flame retardants, phosphoric acid flame retardants, and silicone flame retardants are preferred because they tend to provide excellent flame retardancy to the thermoplastic resin composition without deterioration of the impact resistance which is the primary purpose of the present invention. For example, it is preferred to use compounds containing halogen atoms, phosphoric acid compounds, silicone compounds, organic metal salt compounds containing halogen atoms, and the like. Specific examples of the flame retardants include phosphoric acid compounds such as phosphate compounds, phosphite compounds, and condensed phosphate compounds; aluminum hydroxide; oxidized antimony compounds such as antimony trioxide and antimony pentoxide; halogen containing compounds such as phosphate compounds containing halogen atoms, condensed phosphate compounds containing halogen atoms, chlorinated paraffin, and brominated aromatic compounds, like brominated aromatic triazine and brominated phenyl alkyl ether; sulfonate compounds and sulfate compounds; and epoxy reactive flame retardants.

When the thermoplastic resin compound of the present invention is formulated, known stabilizers and fillers can be added during the compounding, kneading or molding according to the intended use, as far as the physical properties of these compounds are not impaired.

Examples of the stabilizer include metal-based stabilizers and non-metal-based stabilizers. Specific examples of the metal-based stabilizers include lead stabilizer such as tribasic lead sulfate, dibasic lead phosphite, basic lead sulfite, or lead silicate; metal soap stabilizer derived from a metal such as potassium, magnesium, barium, zinc, cadmium, or lead and fatty acid such as 2-ethylhexanoic acid, lauric acid, myristic acid, palmitic acid, stearic acid, isostearic acid, hydroxystearic acid, oleic acid, ricinoleic acid, linoleic acid, and behenic acid; organotin stabilizer derived from an alkyl group or an ester group and fatty acid salt, maleate or sulfide; composite metal soap stabilizer such as Ba—Zn, Ca—Zn, Ba—Ca—Sn, Ca—Mg—Sn, Ca—Zn—Sn, Pb—Sn, and Pb—Ba—Ca; metal salt stabilizer derived usually from a group of metal such as barium and zinc and two or more organic acids such as a branched fatty acid (e.g. 2-ethylhexanoic acid, isodecanoic acid, trialkylacetic acid, etc.), unsaturated acid (e.g. oleic acid, ricinoleic acid, linoleic acid, etc.), alicyclic acid (e.g. naphthenic acid, etc.) and aromatic acid (e.g. carbolic acid, benzoic acid, salicylic acid, substituted derivatives thereof, etc.); and a metal salt liquid stabilizer obtained by dissolving these stabilizers in an organic solvent such as petroleum-based hydrocarbon, alcohol or glycerin derivative, and incorporating auxiliary stabilizers such as phosphite, epoxy compounds, color development inhibitors, transparency modifiers, photostabilizers, antioxidants, plate-out inhibitors and lubricants. Specific examples of the on-metal-based stabilizers include epoxydated compound such as epoxy resin, epoxidated soybean oil, epoxidated vegetable oil, and epoxidated fatty acid alkyl ester; organophosphite which contains phosphorous substituted with an alkyl group, an aryl group, a cycloalkyl group, or an alkoxy group and also contains a dihydric alcohol (e.g. propylene glycol, etc.) or an aromatic compound (e.g. hydroquinone, bisphenol A, etc.); hindered phenol such as bisphenol dimerized by 2,4-di-t-butyl-3-hydroxytoluene (BHT), sulfur, or a methylene group; ultraviolet absorber such as salicylate, benzophenone, and benzotriazole; photostabilizer such as hindered amine and nickel complex salt; ultraviolet screening agent such as carbon black and rutile type titanium oxide; polyhydric alcohol such as trimethylolpropane, pentaerythritol, sorbitol, and mannitol; nitrogen-containing compound such as β-aminocrotonate, 2-phenylindole, diphenylthiourea, and dicyandiamide; sulfur-containing compound such as dialkylthiodipropionate; keto compound such as acetoacetate, dehydroacetic acid, and β-diketone; organosilicon compound ; and borate. These compounds may be used either singly or as a mixture of two or more of them.

Specific examples of the fillers include carbonate such as heavy calcium carbonate, precipitated calcium carbonate, and gelatinous calcium carbonate; inorganic fillers such as titanium oxide, clay, talc, mica, silica, carbon black, graphite, glass beads, glass fiber, carbon fiber, and metal fiber; organic fillers such as organic fiber made of polyamide, and silicone; and natural organic material such as wood flour. Especially, fiber-reinforced resin compounds containing fiber reinforcements such as glass fiber and carbon fiber are very useful.

When the thermoplastic resin compound of the present invention is formulated, additives can also be added. Specific examples of the additives include impact modifiers except for the present invention such as MBS, ABS, AES, NBR (acrylonitrile-butadiene copolymerized rubber), EVA (ethylene-vinyl acetate copolymer), chlorinated polyethylene, acrylic rubber, polyalkyl (meth)acrylate rubber graft copolymer, and thermoplastic elastomer; processing aids such as (meth)acrylate copolymer; alkyl esters of aromatic polybasic acids, such as dibutyl phthalate, dioctyl phthalate, diisodecyl phthalate, diisononyl phthalate, diundecyl phthalate, trioctyl trimellitate, and triisooctyl trimellitate; alkyl esters of aliphatic polybasic fatty acids, such as dibutyl adipate, dioctyl adipate, dithiononyl adipate, dibutyl azelate, dioctyl azelate, and diisononyl azelate; phosphates such as tricresyl phosphate; polyester plasticizers such as those obtained by sealing the ends of a polycondensate having a molecular weight within a range from about 600 to 8,000, which is prepared from a polyhydric carboxylic acid (e.g. adipic acid, azelaic acid, sebacic acid, phthalic acid, etc.) and a polyhydric alcohol (e.g. ethylene glycol, 1,2-propylene glycol, 1,2-butyleneglycol, 1,3-butyleneglycol, 1,4-butyleneglycol, etc.), with a monohydric alcohol or a monohydric carboxylic acid; epoxy plasticizers such as epoxidated soybean oil, epoxidated linseed oil, and epoxidated tall oil fatty acid-2-ethylhexyl; plasticizers such as chlorinated paraffin; lubricant such as pure hydrocarbons (e.g. liquid paraffin, low-molecular polyethylene, etc.), halogenated hydrocarbon, fatty acids (e.g. higher fatty acid, oxyfatty acid, etc.), fatty amides, polyhydric alcohol esters of fatty acids (e.g. gyceride, etc.), fatty alcohol ester (ester wax) of fatty acid, metal soap, fatty alcohol, polyhydric alcohol, polyglycol, polyglycerol, esters (e.g. partial ester of fatty acid and polyhydric alcohol, partial ester of fatty acid and polyglycol, partial ester of fatty acid and polyglycerol, etc.), and (meth)acrylate copolymer; heat resistance modifiers such as (meth)acrylate copolymer, imide copolymer, and styrene-acrylonitrile copolymer; mold release agents; nucleating agents; fluidity modifiers; colorants; antistatic agents; conductivity-imparting agents; surfactants; anti-fogging agents; blowing agents; and anti-fungus agents.

A method for producing the resin composition on the present invention that is the thermoplastic resin composition comprising thermoplastic resin and the impact modifier of the present invention is not specifically limited, but a melt-mixing method is preferred usually. A small amount of a solvent may be used if it is needed. Examples of the mixing device include an extruder, banbury mixer, roller, and kneader. These mixing devices are operated in a batch-wise manner or continuously. There is no limitation on the mixing order.

The usage of the resin composition of the present invention is not restricted. For example, it can be applied to building materials, automobiles, toys, convenience goods such as stationary. Especially, it can widely be applied to molding materials which require excellent impact resistance such as automobile parts, OA equipment, and household appliances.

The following Examples further illustrate the present invention in detail. In the description, 'parts' means 'parts by weight'.

PRODUCTION EXAMPLE 1-1

Production of an Impact Modifier (1-1)

Into a separable flask equipped with a condenser and a stirrer was charged 0.3 parts of boric acid and 0.03 parts of sodium carbonate which were dissolved in 200 parts of water, and the mixture was heated up to 80° C. while replacing by nitrogen which was added into the flask at the flow of 200 ml/min for 50 minutes, after that 0.7 parts of potassium persulfate was charged and this condition was kept for 5 minutes. Then, a mixture of 10 parts of n-butyl acrylate, 0.5% by weight of allyl methacrylate which was on the basis of the amount of the n-butyl acrylate, and 0.5% by weight of n-octyl mercaptan which was on the basis of the amount of the n-butyl acrylate was added into the flask over 10 minutes, further this condition at 80° C. was kept for 100 minutes, and the first step of the polymerization process for producing a rubber polymer (A) was finished.

After that, a mixture of 0.002 parts of ferrous sulfate, 0.006 parts of ethylenediaminetetraacetic acid, disodium salt, 0.1 parts of rongalit, and 5 parts of distilled water was added and this condition was kept for 5 minutes. Then 0.05 parts of sodium laurylsulfate was added into the flask, further a mixture of 75 parts of n-butyl acrylate, 0.5% by weight of allyl methacrylate which was on the basis of the amount of the n-butyl acrylate, and 0.1% by weight of t-butyl hydroperoxide which was on the basis of the amount of the n-butyl acrylate was added dropwise into the flask over 200 minutes. During this polymerization, three batches of 0.05 parts of sodium laurylsulfate were added at three periods of 45 minutes later, 90 minutes later, and 125 minutes later from the beginning of the dropping of the mixture. After the dropping was finished, this condition at 80° C. was kept for 150 minutes, and the second step of the polymerization process was finished and a latex of the rubber polymer (A) [polyalkyl (meth)acrylate composite rubber] was obtained.

The polymerization rate of the rubber polymer (A) was 99.9%. The gel content of the latex was 92.5%. This content was measured by solidifying this latex with ethanol, drying it to obtain a solid, and extracting the solid with toluene at 90° C. for 12 hours.

The temperature of the latex of the rubber polymer (A) was lowered to 65° C., and a mixture of 13 parts of methyl methacrylate, 2 parts of butyl acrylate, and 1% by weight of allyl methacrylate which was on the basis of the sum of the both of the monomers was added into the flask, further a mixture of 0.05 parts of sodium laurylsulfate and 0.05 parts of rongalit which were dissolved in 10 parts of water was added into the flask and graft polymerization was initiated. After this condition was kept for 150 minutes, the polymerization was finished and latex of acrylic rubber graft copolymer comprising the rubber polymer (A) and the branches (B) was obtained. The obtained latex of the graft copolymer was added dropwise into 200 parts of hot water dissolving 5.0% by weight of calcium acetate, followed by solidification, separation, washing, and further drying at 75° C. for 16 hours to prepare a powdery acrylic rubber graft copolymer [impact modifier (1-1)].

The compositions of the monomers for the above-mentioned process of the production are shown in the following Table 1.

Results of measurements of the particle diameter distributions of the rubber polymer (A) and grass transition temperatures of the acrylic rubber graft copolymers are shown in the following Table 5.

PRODUCTION EXAMPLE 2-1

Production of an Impact Modifier (2-1)

Into a separable flask equipped with a condenser and a stirrer was charged 0.0008 parts of sodium laurylsulfate which was dissolved in 200 parts of water, then a mixture of 1 part of n-butyl acrylate, 0.2% by weight of allyl methacrylate which was on the basis of the amount of the n-butyl acrylate, and 0.5% by weight of t-butyl hydroperoxide which was on the basis of the amount of the n-butyl acrylate was charged, and the inside of the flask was replaced by nitrogen which was added into the flask at the flow of 200 ml/min for 50 minutes. After that the inside of the flask was heated up to 65° C., then a mixture of 0.002 parts of ferrous sulfate, 0.006 parts of ethylenediaminetetraacetic acid, disodium salt, 0.02 parts of rongalit, and 5 parts of distilled water was added, further this condition was kept for 100 minutes, and the first step of the polymerization process was finished.

While the temperature of the inside of the flask was kept at 60° C., 0.1 parts of sodium laurylsulfate was added, then a mixture of 5 parts of n-butyl acrylate, 0.2% by weight of allyl methacrylate which was on the basis of the amount of the n-butyl acrylate, and 0.5% by weight of t-butyl hydroperoxide which was on the basis of the amount of the n-butyl acrylate was added into the flask over 25 minutes, further this condition was kept for 150 minutes, and the second step of the polymerization process was finished.

While the temperature of the inside of the flask was kept at 55° C., a mixture of 14 parts of n-butyl acrylate, 0.2% by weight of allyl methacrylate which was on the basis of the amount of the n-butyl acrylate, and 0.2% by weight of t-butyl hydroperoxide which was on. the basis of the amount of the n-butyl acrylate was charged in a lump into the flask, then this condition was kept for 5 minutes, further a mixture of 0.05 parts of rongalit and 10 parts of distilled water was added, and the third polymerization was started. Then the temperature of the inside of the flask was kept at 65° C. for 100 minutes, and the third step of the polymerization process was finished.

While the temperature of the inside of the flask was kept at 55° C., a mixture of 65 parts of n-butyl acrylate, 0.5% by weight of allyl methacrylate which was on the basis of the amount of the n-butyl acrylate, and 0.5% by weight of t-butyl hydroperoxide which was on the basis of the amount of the n-butyl acrylate was charged in a lump into the flask, then this condition was kept for 5 minutes, further a mixture of 0.15 parts of rongalit and 10 parts of distilled water was added, and the fourth polymerization was started. Then the temperature of the inside of the flask was kept at 65° C. for 100 minutes, and the fourth step of the polymerization process for producing a rubber polymer (A) was finished. The polymerization rate of the rubber polymer (A) was 99.8%. The gel content of the latex was 95.7%.

The temperature of the latex of the rubber polymer (A) was kept at 65° C., and a mixture of 14.5 parts of methyl methacrylate, 0.5 parts of butyl acrylate, and 0.5% by weight of t-butyl hydroperoxide which is on the basis of the sum of the both of the monomers was added dropwise into the flask over 25 minutes. After this condition was kept for 150 minutes, the graft polymerization was finished and latex of acrylic rubber graft copolymer comprising the rubber polymer (A) and the branches (B) was obtained. The obtained latex of the graft copolymer was added dropwise into 200 parts of hot water dissolving 5.0% by weight of calcium acetate, followed by solidification, separation, washing, and further drying at 75° C. for 16 hours to prepare a powdery acrylic rubber graft copolymer [impact modifier (2-1)].

The compositions of the monomers for the above-mentioned process of the production are shown in the following Table 2.

Results of measurements of the particle diameter distributions of the rubber polymer (A) and grass transition temperatures of the acrylic rubber graft copolymers are shown in the following Table 5.

PRODUCTION EXAMPLE 3-1

Production of an Impact Modifier (3-1)

Into a homomixer (T.K. Homo Mixer by Tokusyu Kika Kogyo Co., Ltd.) was charged a mixture of 15 parts of 2-ethylhexyl acrylate, 0.2% by weight of allyl methacrylate which was on the basis of the amount of the 2-ethylhexyl acrylate, 0.2 parts of sodium laurylsulfate, and they were preliminarily dispersed by stirring at 12000 rpm for 5 minutes. Then the forced emulsification treatment process was applied to it under a pressure of 20 MPa by using a homogenizer (LB-40 by Gauling ), and a pre-emulsion was obtained.

Into a separable flask equipped with a condenser and a stirrer was charged the above-mentioned pre-emultion and 120 parts of water, then 0.5% by weight of t-butyl hydroperoxide which was on the basis of the amount of the 2-ethylhexyl acrylate in the pre-emulsion was charged, and the inside of the flask was replaced by nitrogen which was added into the flask at the flow of 200 ml/min for 50 minutes. After that the inside of the flask was heated up to 50° C., then a mixture of 0.002 parts of ferrous sulfate, 0.006 parts of ethylenediaminetetraacetic acid, disodium salt, 0.02 parts of rongalit, and 5 parts of distilled water was added, further this condition was kept for 100 minutes, and the first step of the polymerization process was finished.

While the temperature of the inside of the flask was kept at 60° C., a pre-emulsion having the same composition as the pre-emulsion prepared above was charged in a lump into the flask, further 0.1 parts of sodium laurylsulfate and 0.5% by weight of t-butyl hydroperoxide which was on the basis of the amount of the 2-ethylhexyl acrylate were added, and the temperature of 60° C. was kept with stirring. After taht a mixture of 0.02 parts of rongalit and 5 parts of distilled water was added, further this condition was kept for 100 minutes, and the second step of the polymerization process was finished, and a rubber polymer (A1) was obtained.

While the temperature of the inside of the flask was kept at 60° C., as components of a rubber polymer (A2), a mixture of 55 parts of n-butyl acrylate, 0.5% by weight of allyl methacrylate which was on the basis of the amount of the n-butyl acrylate, and 0.5% by weight of t-butyl hydroperoxide which was on the basis of the amount of the n-butyl acrylate was charged in a lump into the flask, then this condition was kept-for 5 minutes, further a mixture of 0.1 parts of rongalit and 10 parts of distilled water was added, and the third polymerization was started. Then the temperature of the inside of the flask was kept at 65° C. for 100 minutes, and the third step of the polymerization process was finished, and a latex of rubber polymer (A) containing the above-mentioned components of (A1) and (A2). The polymerization rate of the rubber polymer (A) was 99.9%. The gel content of the latex was 96.7%.

The temperature of the latex of the rubber polymer (A) was kept at 65° C., and a mixture of 14.5 parts of methyl methacrylate, 0.5 parts of butyl acrylate, and 0.5% by weight of t-butyl hydroperoxide which is on the basis of the sum of the both of the monomers was added dropwise into the flask over 25 minutes. After this condition was kept for 150 minutes, the graft polymerization was finished and latex of acrylic rubber graft copolymer comprising the rubber polymer (A) and the branches (B) was obtained. The obtained latex of the graft copolymer was added dropwise into 200 parts of hot water dissolving 5.0% by weight of calcium acetate, followed by solidification, separation, washing, and further drying at 75° C. for 16 hours to prepare a powdery acrylic rubber graft copolymer [impact modifier (3-1)].

The compositions of the monomers for the above-mentioned process of the production are shown in the following Table 6.

Results of measurements of the particle diameter distributions of the rubber polymer (A) and grass transition temperatures of the acrylic rubber graft copolymers are shown in the following Table 5.

PRODUCTION EXAMPLES FROM 1-2 TO 1-12, PRODUCTION EXAMPLES FROM 2-2 TO 2-6, AND PRODUCTION EXAMPLES FROM 3-2 TO 3-11

Using the same procedure as in the production example 1-1 except the composition, and applying compositions shown in the Table 1, impact modifiers 1-2 to 1-12 were produced. Using the same procedure as in the production example 2-1 except the composition, and applying compositions shown in the Table 2, impact modifiers 2-2 to 2-6 were produced. Using the same procedure as in the production example 3-1 except the composition, and applying compositions shown in the Table 3, impact modifiers 3-2 to 3-11 were produced. The results of the measurements of the particle diameter distributions of the rubber polymer (A), the glass transition temperatures of the acrylic rubber graft copolymers, and the amounts of the component (R) [the compound (R) or the salt] were shown in the Table 5 and the Table 6.

The amounts of the component (R) were determined by the quantitative analysis shown below. A weighed sample was dissolved or dispersed in chloroform, then it was extracted by about ten times amount of methanol, and the methanol layer was concentrated. It was washed by methanol and concentrated again. After that, the concentrated sample was added into 100 ml of pure water and it was extracted at 70° C. for 24 hours, then it was cooled down to room temperature and filtrated, further the filtrate was evaporated to dryness, and an extract by water was obtained and weighed. The components of the extract were analyzed qualitatively and quantitatively by HPLC and FT-IR. The conditions of the analysis were as follows.

Column: ODS Type (Zorbax-ODS, Diameter: 4.6 mm, Length: 150 mm)
Eluate: Acetonitrile/DIW=from 10/90 to 100/0 in 20 minutes (1.0 ml/min)
Detector: DAD (250 nm)

PRODUCTION EXAMPLE C1

Production of an Impact Modifier (C1)

Using the same procedure as in the production example 1-1, except that the mixture containing '0.3 parts of boric acid and 0.03 parts of sodium carbonate which were dissolved in 200 parts of water' which was used in the charging step of the first polymerization process was further containing 0.45 parts of potassium bovine fatty acid ester and that each of the '0.05 parts of the sodium laurylsulfate' which was added in the flask for a few times was changed to '0.3 parts of potassium bovine fatty acid ester', an impact modifier (C1) was produced and the particle diameter distribution and the grass transition temperature were measured. The results are shown in the following Table 4 and Table 6.

PRODUCTION EXAMPLE C2

Production of an Impact Modifier (C2)

Using the same procedure as in the production example 1-1, except that the mixture containing '0.3 parts of boric acid and 0.03 parts of sodium carbonate which were dissolved in 200 parts of water' which was used in the charging step of the first polymerization process was further containing 0.7 parts of potassium bovine fatty acid ester and that each of the '0.05 parts of the sodium laurylsulfate' which was added in the flask for a few times was changed to '0.4 parts of potassium bovine fatty acid ester', a latex of acrylic rubber graft copolymer (C2A) was obtained. After that, this latex containing 80 parts of solid and the latex of acrylic rubber graft copolymer (1-1) obtained by the Production Example 1-1 containing 20 parts of solid were mixed, then the mixture was solidified and dried by the method applied in the Production Example 1-1, and an impact modifier (C2) was produced. The particle diameter distribution and the grass transition temperature of it were measured. The results are shown in the following Table 4 and Table 6.

PRODUCTION EXAMPLE C3

Production of an Impact Modifier (C3)

Into a homomixer was charged a mixture of 10 parts of 2-ethylhexyl acrylate, 1.0% by weight of allyl methacrylate which was on the basis of the amount of the 2-ethylhexyl acrylate, and 0.08 parts of disodium alkenyl succinate which was dissolved in 19.5 parts of water, and it was preliminarily dispersed by stirring at 10000 rpm. Then it was emulsified under a pressure of 30 MPa by using a homogenizer, and a (meth)acrylate emulsion was obtained.

Into a separable flask equipped with a condenser and a stirrer was charged this emulsion and it was heated up to 50° C. with replacement by nitrogen and stirring, then 0.5 parts of t-butyl hydroperoxide was charged. After that the inside of the flask was kept at 50° C., then a mixture of 0.002 parts of ferrous sulfate, 0.006 parts of ethylenediaminetetraacetic acid, disodium salt, 0.026 parts of rongalit, and 5 parts of distilled water was added, further this condition was kept for 5 hours, and the first step of the polymerization process was finished and a latex of acrylic rubber (C3-1) was obtained.

Into a separable flask equipped with a stirrer was charged the latex of acrylic rubber (C3-1) and distilled water which made the amount of the distilled water in the flask 195 parts. After that, a mixture of 75 parts of n-butyl acrylate, 2.0% by weight of allyl methacrylate which was on the basis of the amount of the n-butyl acrylate, and 0.32 parts of t-butyl hydroperoxide was charged into the flask, further it was stirred for 10 minutes, and the mixture was soaked into the particles of the acrylic rubber latex. Then 0.5 parts of polyoxythylene ether sulfate was added and it was stirred for 10 minutes, after that it was replaced by nitrogen and heated up to 50° C., further a mixture of 0.002 parts of ferrous sulfate, 0.006 parts of ethylenediaminetetraacetic acid, disodium salt, 0.026 parts of rongalit, and 5 parts of distilled water was added, and the second polymerization was started. Then the temperature of the inside of the flask was kept at 70° C. for 2 hours, and the second step of the polymerization process was finished, and a latex of rubber polymer (A) was obtained. The gel content of the latex was 98.3%.

A mixture of 0.06 parts of t-butyl hydroperoxide, 13 parts of methyl methacrylate, and 2.0 parts of butyl acrylate was added dropwise to the latex of the rubber polymer (A) at 70° C. over 15 minutes, then the temperature was kept at 70° C. for 4 hours, and the graft polymerization was finished and latex of acrylic rubber graft copolymer comprising the rubber polymer (A) and the branches (B) was obtained. The obtained latex of the graft copolymer was added dropwise into 200 parts of hot water dissolving 1.5% by weight of calcium acetate, followed by solidification, separation, washing, and further drying at 75° C. for 16 hours to pre-pare a powdery acrylic rubber graft copo Measurement of Particle Diameter Distribution of Rubber Polymer(A)

Figure 2:
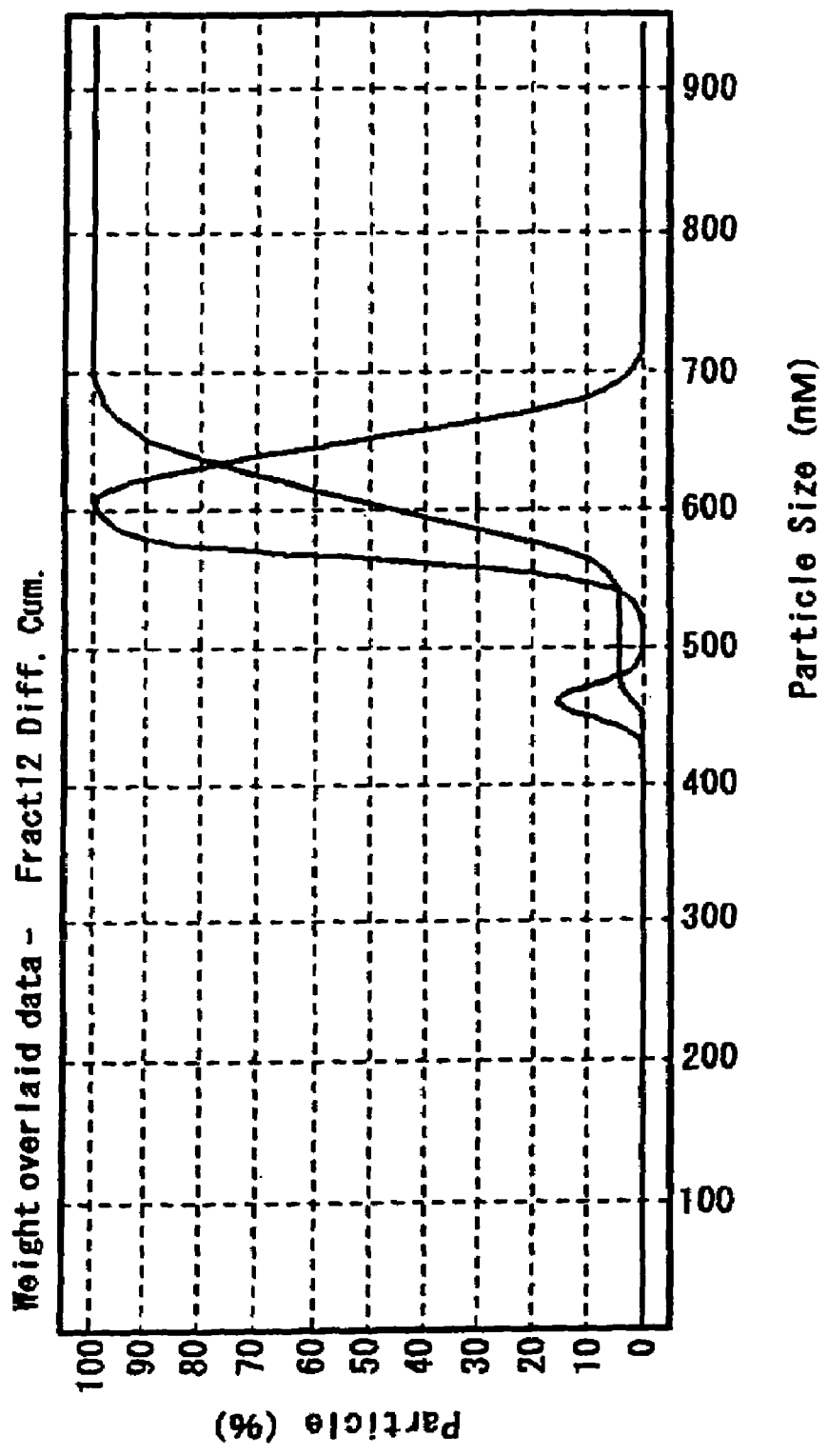
FIG. 2 provides a graph showing a particle size distribution on a weight basis of rubber polymer (A) obtained by Production Example 2-1.
Figure 3:
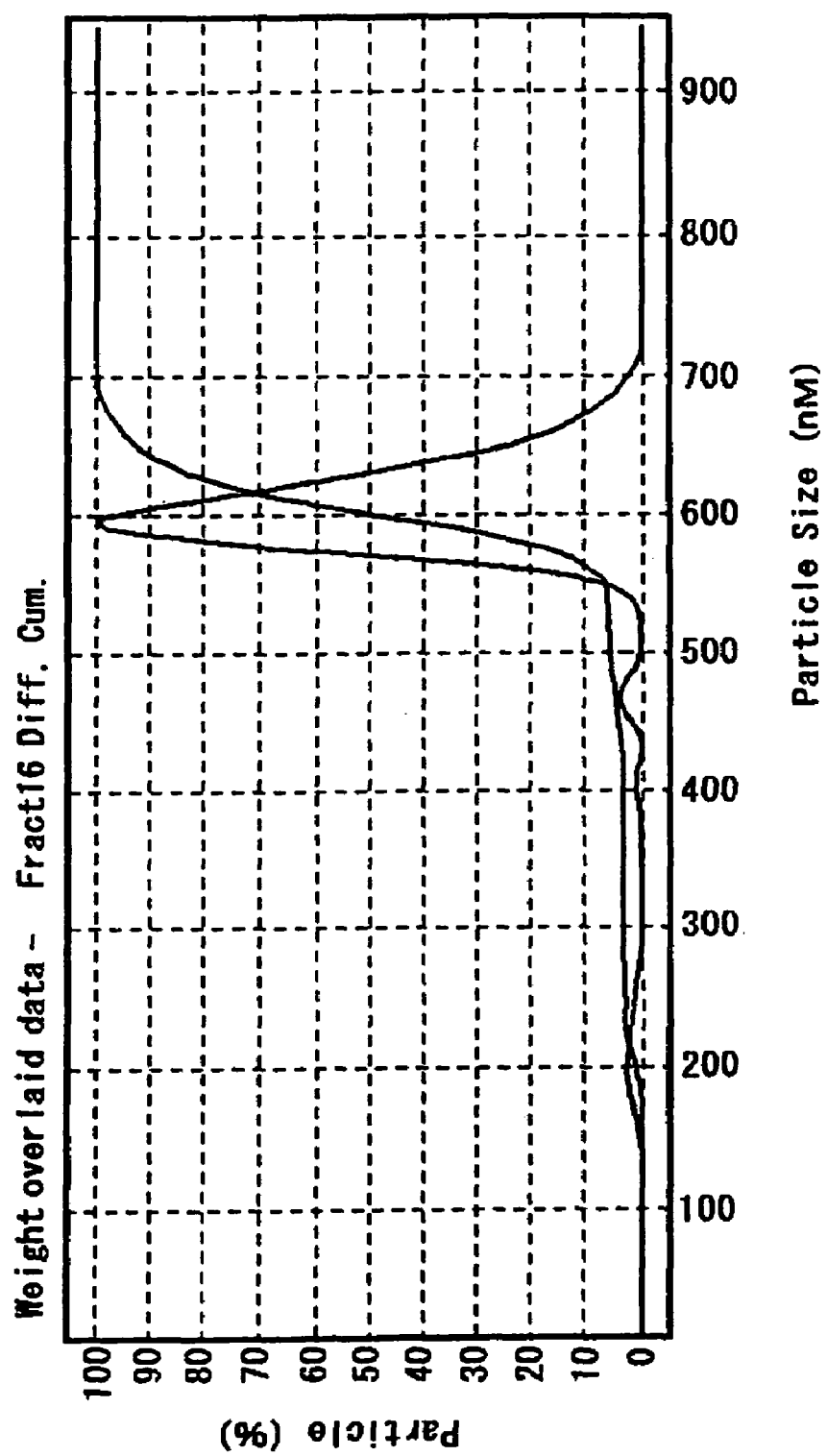
FIG. 3 provides a graph showing a particle size distribution on a weight basis of rubber polymer (A) obtained by Production Example 3-1.

Using samples prepared by diluting the obtained latex with distilled water, the particle diameter distribution was measured by using a particle diameter distribution meter, Model CHDF2000, manufactured by MATEC USA Co. The measurement was conducted under the standard conditions recommended by MATEC Co. Specifically, using an exclusive capillary type cartridge for particle separation and a carrier solution, 0.1 ml of each diluted latex sample having a concentration of about 3% was used for measurement under the fixed conditions of neutral pH, a flow rate of 1.4 ml/minute, a pressure of about 4000 psi and a temperature of 35° C. As the particle size standard, 12 kinds of monodisperse polystyrene having a known particle size within a range from 0.02 μm to 0.8 μm (manufactured by DUKE USA Co.) were used. Each of the following FIG. 1, FIG. 2, and FIG. 3 is the result which represents the particle diameter distribution on a weight basis of the rubber polymer (A) obtained by each of the Production Example 1-1, 2-1, and 3-1.

Measurement of Glass Transition Temperature of Acrylic Rubber Graft Copolymer

A plate, which was obtained by forming 70 parts of the obtained graft copolymer and 30 parts of poly(methyl methacrylate) (PMMA) into pellets using a 25 φ single-screw extruder at 250° C. and forming pellets into a plate having a thickness of 3 mm using a press machine set at 200° C., was cut into samples having a width of 10 mm and a length of 12 mm. Using a meter, Model DMA983, manufactured by TA Instruments Co., the measurement was conducted under the conditions of a heating rate of 2° C. /min and the temperature corresponding to the transition point of the resulting Tan δ curve was determined as the glass transition temperature. In each of the examples, the measured glass transition temperature comes from the poly (alkyl (math) acrylate rubber).

TABLE 1

| | The Rubber Polymer (A) | | | | | | | The Branches (B) | |
|---|---|---|---|---|---|---|---|---|---|
| | The First Step | | | | The Second Step | | | | |
| | BA (parts) | 2EHA (parts) | AMA (%) | n-OM (%) | BA (parts) | 2EHA (parts) | AMA (%) | MMA (parts) | BA (parts) |
| Production Example 1-1 | 10 | — | 0.5 | 0.5 | 75 | — | 0.5 | 13 | 2 |
| Production Example 1-2 | 5 | 5 | 0.5 | 0.5 | 75 | — | 0.5 | 13 | 2 |
| Production Example 1-3 | 9.4 | 0.6 | 0.5 | 0.5 | 70 | 5 | 0.5 | 13 | 2 |
| Production Example 1-4 | 10 | — | 0.5 | 0.5 | 75 | — | 0.5 | 13 | 2 |
| Production Example 1-6 | 10 | — | 0.5 | 0.5 | 75 | — | 0.5 | 13 | 2 |
| Production Example 1-7 | 5 | 5 | 0.5 | 0.5 | 75 | — | 0.5 | 13 | 2 |
| Production Example 1-8 | 9.4 | 0.6 | 0.5 | 0.5 | 70 | 5 | 0.5 | 13 | 2 |
| Production Example 1-9 | 10 | — | 0.5 | 0.5 | 75 | — | 0.5 | 13 | 2 |
| Production Example 1-10 | 5 | 5 | 0.5 | 0.5 | 75 | — | 0.5 | 13 | 2 |
| Production Example 1-11 | 9.4 | 0.6 | 0.5 | 0.5 | 70 | 5 | 0.5 | 13 | 2 |
| Production Example 1-12 | 10 | — | 0.5 | 0.5 | 75 | — | 0.5 | 13 | 1 |

| | The Branches (B) | | | Filler | | |
|---|---|---|---|---|---|---|
| | St (parts) | GMA (parts) | AMA (%) | CALCIUM CARBONATE (parts) | AEROSIL (parts) | TALC (parts) |
| Production Example 1-1 | — | — | 1 | — | — | — |
| Production Example 1-2 | — | — | 1 | — | — | — |
| Production Example 1-3 | — | — | 1 | — | — | — |
| Production Example 1-4 | — | — | 1 | — | — | — |
| Production Example 1-6 | — | — | 1 | — | 0.1 | — |
| Production Example 1-7 | — | — | 1 | 2 | — | — |
| Production Example 1-8 | — | — | 1 | 3 | — | — |
| Production Example 1-9 | — | — | 1 | 2 | — | — |
| Production Example 1-10 | — | — | 1 | — | 0.2 | — |
| Production Example 1-11 | — | — | 1 | — | — | 2 |
| Production Example 1-12 | — | 1 | 1 | — | — | — |

TABLE 2

| | The Rubber Polymer (A) | | | | | | | | The Branches (B) | | | | Filler | |
|---|---|---|---|---|---|---|---|---|---|---|---|---|---|---|
| | The First Step | | The Second Step | | The Third Step | | The Fourth Step | | | | | | CALCIUM CAR- | |
| | BA (parts) | AMA (%) | BA (parts) | AMA (%) | BA (parts) | AMA (%) | BA (parts) | AMA (%) | MMA (parts) | BA (parts) | St (parts) | GMA (parts) | AMA (%) | BONATE (parts) | AEROSIL (parts) |
| Production Example 2-1 | 1 | 0.2 | 5 | 0.2 | 14 | 0.2 | 65 | 0.5 | 14.5 | 0.5 | — | — | — | — | — |
| Production Example 2-2 | 1 | 0.2 | 5 | 0.2 | 14 | 0.2 | 65 | 0.5 | 13 | 1 | — | 1 | — | — | — |
| Production Example 2-3 | 1 | 0.2 | 5 | 0.2 | 14 | 0.2 | 65 | 0.5 | 14.9 | 0.1 | — | — | 1 | — | — |
| Production Example 2-4 | 1 | 0.2 | 5 | 0.2 | 14 | 0.2 | 65 | 0.5 | 13.5 | 0.5 | 1 | — | — | — | — |
| Production Example 2-5 | 1 | 0.2 | 5 | 0.2 | 14 | 0.2 | 65 | 0.5 | 14.9 | 0.1 | — | — | — | 2 | — |
| Production Example 2-6 | 1 | 0.2 | 5 | 0.2 | 14 | 0.2 | 65 | 0.5 | 14.5 | 0.5 | — | — | — | — | 0.1 |

TABLE 3

| | The Rubber Polymer (A) | | | | | | | | | |
|---|---|---|---|---|---|---|---|---|---|---|
| | The First Step | | | The Second Step | | | | The Third Step | | |
| | 2EHA (parts) | TDMA (parts) | AMA (%) | 1,3-BD (%) | 2EHA (parts) | TDMA (parts) | AMA (%) | BA (parts) | AMA (%) | 1,3-BD (%) |
| Production Example 3-1 | 15 | — | 0.2 | — | 15 | — | 0.2 | 55 | 0.5 | — |
| Production Example 3-2 | 10 | — | 0.2 | — | 10 | — | 0.2 | 65 | 1 | — |
| Production Example 3-3 | 5 | — | 0.2 | — | 10 | — | 0.2 | 70 | 0.5 | 0.1 |
| Production Example 3-4 | 12.5 | — | 0.2 | 0.001 | 12.5 | — | 0.2 | 60 | 1.5 | — |
| Production Example 3-5 | 5 | 5 | 0.2 | — | 5 | 5 | 0.2 | 65 | 1.2 | — |
| Production Example 3-6 | 30 | — | 0.2 | — | 30 | — | 0.2 | 25 | 0.5 | — |
| Production Example 3-7 | 10 | — | 0.2 | 0.1 | 10 | — | 0.2 | 65 | 1 | 0.1 |
| Production Example 3-8 | 10 | — | 0.2 | — | 10 | — | 0.2 | 65 | 1 | — |
| Production Example 3-9 | 5 | — | 0.2 | — | 10 | — | 0.2 | 70 | 0.5 | — |
| Production Example 3-10 | 5 | — | 0.2 | — | 10 | — | 0.2 | 70 | 0.5 | — |
| Production Example 3-11 | 5 | — | 0.2 | — | 10 | — | 0.2 | 68 | 0.5 | — |

| | The Branches (B) | | | | | Filler | |
|---|---|---|---|---|---|---|---|
| | MMA (parts) | BA (parts) | St (parts) | GMA (parts) | AMA (%) | CALCIUM CARBONATE (parts) | AEROSIL (parts) |
| Production Example 3-1 | 14.5 | 0.5 | — | — | — | — | — |
| Production Example 3-2 | 14.5 | 0.5 | — | — | — | — | 0.1 |
| Production Example 3-3 | 14.9 | 0.1 | — | — | — | — | 0.1 |
| Production Example 3-4 | 14.5 | 0.5 | — | — | — | 2 | — |
| Production Example 3-5 | 14.9 | 0.1 | — | — | — | — | 0.1 |
| Production Example 3-6 | 14.5 | 0.5 | — | — | — | — | 0.1 |
| Production Example 3-7 | 13.8 | 0.2 | — | — | — | 1 | — |
| Production Example 3-8 | 14.9 | 0.1 | — | 1 | — | — | 0.1 |
| Production Example 3-9 | 14.5 | 0.5 | — | — | 0.5 | — | 0.1 |
| Production Example 3-10 | 14.9 | 0.1 | 1 | — | — | 1 | — |
| Production Example 3-11 | 14.5 | 0.5 | 1 | — | — | 1 | — |

TABLE 4

| | The Rubber Polymer (A) | | | | | | The Branches (B) | | |
|---|---|---|---|---|---|---|---|---|---|
| | The First Step | | | | The Second Step | | | | |
| | BA (parts) | 2EHA (parts) | AMA (%) | n-OM (%) | BA (parts) | AMA (%) | MMA (parts) | BA (parts) | AMA (%) |
| Production Example C1 | 10 | — | 0.5 | 0.5 | 75 | 0.5 | 13 | 2 | 1 |
| Production Example C2 | 10 | — | 0.5 | 0.5 | 75 | 0.5 | 13 | 2 | 1 |
| Production Example C3 | — | 10 | 1 | — | 75 | 2 | 13 | 2 | — |

In the Table 1 to Table 2, the abbreviations mean compounds shown as follows.

BA: n-butyl acrylate
2EHA: 2-ethylhexyl acrylate
TDMA: tridecyl mathacrylate
AMA: allyl methacrylate
1,3-BD: 1,3-butylene glycol dimathacrylate
n-OM: n-octyl mercaptan
MMA: methyl methacrylate
St: styrene
GMA: glycidyl methacrylate In the Table 1 to Table 4, each of the values represented by '%' means proportion of a compound based on percent by weight to the sum of the charged monomers in each of the steps.

TABLE 5

| | The rubber polymer (A) | | | | | | |
|---|---|---|---|---|---|---|---|
| | Glass transition temperature Tg | | | Amount of the component (R) in | | Peak position of | Proportion of particles having a particle size |
| | The number of detected temperature | (° C.) | (° C.) | the impact modifier (ppm) | Distribution state | the heaviest group (nm) | of 400 to 1000 nm (% by weight) |
| Production Example 1-1 | 1 | −28 | — | — | Mono dispersion | 580 | 100 |
| Production Example 1-2 | 1 | −28 | — | — | Mono dispersion | 600 | 100 |
| Production Example 1-3 | 1 | −31 | — | — | Mono dispersion | 570 | 100 |
| Production Example 1-4 | 1 | −28 | — | — | Mono dispersion | 520 | 100 |
| Production Example 1-6 | 1 | −28 | — | — | Mono dispersion | 570 | 100 |
| Production Example 1-7 | 1 | −28 | — | — | Mono dispersion | 600 | 100 |
| Production Example 1-8 | 1 | −31 | — | — | Mono dispersion | 610 | 100 |
| Production Example 1-9 | 1 | −28 | — | — | Mono dispersion | 580 | 100 |
| Production Example 1-10 | 1 | −28 | — | — | Mono dispersion | 570 | 100 |
| Production Example 1-11 | 1 | −31 | — | — | Mono dispersion | 590 | 100 |
| Production Example 1-12 | 1 | −28 | — | — | Mono dispersion | 570 | 100 |
| Production Example 2-1 | 1 | −35 | — | — | Mono dispersion | 510 | 100 |
| Production Example 2-2 | 1 | −35 | — | — | Mono dispersion | 530 | 100 |
| Production Example 2-3 | 1 | −35 | — | 3 | Mono dispersion | 520 | 100 |
| Production Example 2-4 | 1 | −35 | — | 300 | Mono dispersion | 540 | 100 |
| Production Example 2-5 | 1 | −35 | — | 12 | Mono dispersion | 580 | 100 |
| Production Example 2-6 | 1 | −35 | — | 100 | Mono dispersion | 570 | 100 |

TABLE 6

| | The rubber polymer (A) | | | | | | |
|---|---|---|---|---|---|---|---|
| | Glass transition temperature Tg | | | Amount of the component (R) in | | Peak position of | Proportion of particles having a particle size |
| | The number of detected temperature | (° C.) | (° C.) | the impact modifier (ppm) | Distribution state | the heaviest group (nm) | of 400 to 1000 nm (% by weight) |
| Production Example 3-1 | 2 | −58 | −30 | — | Double dispersion | 600 | 98 |
| Production Example 3-2 | 2 | −58 | −30 | 10 | Double dispersion | 550 | 99 |
| Production Example 3-3 | 2 | −58 | −30 | — | Double dispersion | 580 | 97 |
| Production Example 3-4 | 2 | −58 | −30 | — | Double dispersion | 560 | 98 |
| Production Example 3-5 | 2 | −58 | −30 | 50 | Double dispersion | 540 | 98 |
| Production Example 3-6 | 2 | −58 | −30 | 20 | Double dispersion | 520 | 97 |
| Production Example 3-7 | 2 | −58 | −30 | 100 | Double dispersion | 570 | 98 |
| Production Example 3-8 | 2 | −58 | −30 | 10 | Double dispersion | 580 | 96 |
| Production Example 3-9 | 2 | −58 | −30 | — | Double dispersion | 590 | 97 |
| Production Example 3-10 | 2 | −58 | −30 | 5 | Double dispersion | 610 | 98 |
| Production Example 3-11 | 2 | −58 | −28 | — | Double dispersion | 600 | 98 |
| Production Example C1 | 1 | −28 | — | — | Double dispersion | 220 | 0 |
| Production Example C2 | 1 | −28 | — | — | Double dispersion | 170 | 20 |
| Production Example C3 | 1 | −52 | −28 | — | Double dispersion | 220 | 8 |

EXAMPLES 1 TO 28 AND COMPARATIVE EXAMPLES 1 to 4

In each of the Examples, the impact modifier obtained by each of the Production Examples was used, and in each of the Comparative Examples, each of the impact modifiers (C1 to C3) obtained by the Production Examples C1 to C3 and MBS resin (Metablen C-223A, manufactured by Mitsubishi Rayon Co., Ltd.) was used. Pellets were prepared by adding these impact modifiers to a variety of thermoplastic resins (matrix resins). Specifically, seven kinds of compositions shown in the following Table 7 (composition 1 to 7) were mixed with henshel mixer for 4 minutes, and they were melted, kneaded, and formed into pellets by using a 30 mm φ twin-screw extruder at 280° C. of cylinder temperature. Before the thermoplastic resins as the matrix were used, they were dried under the recommended conditions by suppliers to avoid influences such as hydrolysis comes from residuary moisture.

Using the obtained pellets containing thermoplastic resin compositions, and applying the following methods, impact resistance, heat transformation resistance, heat resistance in humid atmosphere, heat discoloration, and coloringability were evaluated. The results were shown in the following FIG. 8 and FIG. 9.

Impact Resistance Test, Weather Resistance Test:

Using the obtained pellets, ⅛ inch Izod test pieces were produced by injection molding. Izod impact resistance (J/m) of the just molded test pieces was evaluated by the method defined in ASTM D256 at 23° C. And the test pieces were exposed in an Eyesuper UV tester (manufactured by Dainippon Plastics Co., Ltd.) which was controlled to a temperature of 60° C. for 8 hours, then they were exposed in a thermo-hygrostat which was controlled to a temperature of 60° C. and a humidity of 95%, the term of the exposure was for 16 hours and it was repeated five times. Further the Izod impact resistance (J/m) of the exposed test pieces was measured by the method defined in ASTM D256 at 23° C., and the impact resistance after the weather resistance test was evaluated.

The ductility-brittleness transition temperature in the following Table was a temperature at which 50% of the test pieces showed ductility calculated by test results. When the temperature is lower, the impact resistance at low temperature is regarded as better.

Heat Transformation Resistance Test

Using the obtained pellets, burning bars having ¼ inch thickness were produced by injection molding. And using a auto-HDT meter (manufactured by Toyo Seiki Seisaku-sho, Ltd.), heat transformation resistance of the bars was evaluated by the method defined in ASTM D648. When the heat transformation temperature is higher, the heat transformation resistance is regarded as better.

Heat Resistance in Humid Atmosphere

Using the obtained pellets, melt-flaw rates of them were measured. Further, using the obtained pellets exposed in a pressure cooker (manufactured by Hirayama Manufacturing Corporation) which was controlled to a temperature of 120° C. and humidity of 100% for 60 hours, melt-flaw rates of them were measured. And each of the difference was calculated. When the difference is smaller, the heat resistance in humid atmosphere is regarded as better.

Heat Discoloration

Using the obtained pellets, flat plates having a width of 10 cm and a length of 10 cm were produced by injection molding. And using a meter (Model CMS-1500, manufactured by Murakami Color Research Laboratory), yellowing what is called YI values of the plates were evaluated. Further, using the obtained pellets heated in air atmosphere at 140° C. for 20 hours, the YI values were evaluated again, and each of the difference was calculated. When the difference is smaller, the coloring by heat is less, and the heat discoloration is regarded as better.

Coloringability

Using the obtained pellets and 0.5parts of carbon black (manufactured by Mitsubishi Chemical), flat plates having a width of 10 cm and a length of 10 cm were produced by injection molding. And using a meter (Model CMS-1500, manufactured by Murakami Color Research Laboratory), L* values which were a basis of coloringability were measured. When the value is smaller, the coloringability is regarded as better.

TABLE 7

| | Component resin (parts) | | | | | | | |
|---|---|---|---|---|---|---|---|---|
| | PC | PBT | ABS | SAN | HIPS | PA | PE | Graft Copolymer |
| Composition 1 | 55 | 45 | | | | | | 10 |
| Composition 2 | 100 | | | | | | | 5 |
| Composition 3 | | 100 | | | | | | 11 |
| Composition 4 | 75 | | 10 | 15 | | | | 5 |
| Composition 5 | 60 | | | | 40 | | | 15 |
| Composition 6 | | | | | | 100 | | 15 |
| Composition 7 | | | | | | | 100 | 10 |

In the Table 7, the abbreviations of the thermoplastic resins mean resins shown as follows.

PC: polycarbonate resin (Bisphenol A type polycarbonate resin having a viscosity-average molecular weight of 20,000)

PBT: polyester resin (polytetrabutylene terephthalate having a limiting viscosity [η] of 1.05)

ABS: ABS resin (Diapet 3001 manufactured by Mitsubishi Rayon Co., Ltd.)

SAN: styrene-acrylonitrile copolymer (AP789 manufactured by Asahi Kasei Corporation)

HIPS: high-impact polystyrene (TOPOREX 876-HF manufactured by Mitsui Chemicals Inc.)

PA: polyamide resin (PA66; CM3001 N manufactured by TORAY Industries, Inc.)

PE: polyethylene (High-density polyethylene; NOVATEC HJ580 manufactured by Japan Polychem Corporation)

TABLE 8

| | | Impact resistance Izod impact resistance (J/m) 23° C. | | | | | | | After weather resistance test | | Impact resistance at low temperature: Ductility-brittleness transition temperature (° C.) | |
|---|---|---|---|---|---|---|---|---|---|---|---|---|
| | | Just after molding | | | | | | | | | | |
| | Modifier | Composition 1 | Composition 2 | Composition 3 | Composition 4 | Composition 5 | Composition 6 | Composition 7 | Composition 1 | Composition 2 | Composition 1 | Composition 2 |
| Example 1 | Production Example 1-1 | 800 | 780 | 200 | 730 | 700 | 700 | 35 | 770 | 750 | −22 | −32 |
| Example 2 | Production Example 1-2 | 810 | 780 | 210 | 750 | 700 | 710 | 35 | 780 | 740 | −20 | −30 |
| Example 3 | Production Example 1-3 | 800 | 790 | 220 | 740 | 680 | 710 | 35 | 750 | 720 | −22 | −30 |
| Example 4 | Production Example 1-4 | 780 | 780 | 210 | 730 | 720 | 720 | 35 | 750 | 740 | −22 | −30 |
| Example 5 | Production Example 1-6 | 780 | 780 | 220 | 730 | 720 | 700 | 35 | 750 | 750 | −19 | −32 |
| Example 6 | Production Example 1-7 | 790 | 780 | 210 | 750 | 740 | 710 | 35 | 740 | 740 | −22 | −30 |
| Example 7 | Production Example 1-8 | 800 | 790 | 200 | 740 | 730 | 710 | 35 | 750 | 720 | −18 | −32 |
| Example 8 | Production Example 1-9 | 800 | 780 | 200 | 730 | 740 | 720 | 35 | 750 | 740 | −21 | −30 |
| Example 9 | Production Example 1-10 | 760 | 780 | 230 | 730 | 720 | 700 | 35 | 720 | 750 | −20 | −32 |
| Example 10 | Production Example 1-11 | 780 | 780 | 210 | 750 | 710 | 710 | 35 | 780 | 740 | −18 | −30 |
| Example 11 | Production Example 1-12 | 800 | 790 | 220 | 740 | 730 | 710 | 35 | 750 | 720 | −22 | −30 |
| Example 12 | Production Example 2-1 | 820 | 780 | 230 | 730 | 760 | 750 | 35 | 810 | 740 | −24 | −32 |
| Example 13 | Production Example 2-2 | 830 | 780 | 260 | 730 | 770 | 720 | 35 | 810 | 740 | −25 | −32 |
| Example 14 | Production Example 2-3 | 880 | 780 | 250 | 730 | 780 | 780 | 40 | 810 | 740 | −24 | −31 |
| Example 15 | Production Example 2-4 | 880 | 780 | 240 | 730 | 790 | 760 | 40 | 810 | 740 | −25 | −30 |

TABLE 8-continued

| | Modifier | | | | | | | | | | |
|---|---|---|---|---|---|---|---|---|---|---|---|
| Example 16 | Production Example 2-5 | 870 | 780 | 240 | 730 | 780 | 770 | 40 | 810 | 740 | −25 | −31 |
| Example 17 | Production Example 2-6 | 880 | 780 | 240 | 730 | 790 | 750 | 40 | 810 | 740 | −23 | −33 |

| | Modifier | Heat transformation resistance (HDT) (° C.) Composition 2 | Difference of MFR between before and after of heat resistance test in humid atmosphere (g/10 min) Composition 2 | Difference of YI value between before and after of heat discoloration test (ΔYI) Composition 2 | Coloringability (ebonyty) L* Composition 1 |
|---|---|---|---|---|---|
| Example 1 | Production Example 1-1 | 125 | 1 | 1.2 | 5.3 |
| Example 2 | Production Example 1-2 | 125 | 2 | 1.1 | 5.2 |
| Example 3 | Production Example 1-3 | 126 | 1 | 1.5 | 5.5 |
| Example 4 | Production Example 1-4 | 125 | 2 | 1.3 | 5.53 |
| Example 5 | Production Example 1-6 | 129 | 1.5 | 1.3 | 5.3 |
| Example 6 | Production Example 1-7 | 130 | 2 | 1 | 5.1 |
| Example 7 | Production Example 1-8 | 130 | 2 | 1.2 | 5.5 |
| Example 8 | Production Example 1-9 | 130 | 1 | 1.4 | 5.53 |
| Example 9 | Production Example 1-10 | 130 | 1.5 | 1.2 | 5.3 |
| Example 10 | Production Example 1-11 | 129 | 2.5 | 1 | 5.4 |
| Example 11 | Production Example 1-12 | 126 | 2 | 1.5 | 5 |
| Example 12 | Production Example 2-1 | 125 | 1 | 1.3 | 4.6 |
| Example 13 | Production Example 2-2 | 126 | 2 | 1.4 | 4.1 |
| Example 14 | Production Example 2-3 | 126 | 2 | 1.2 | 4.7 |
| Example 15 | Production Example 2-4 | 125 | 1 | 1.3 | 4.6 |
| Example 16 | Production Example 2-5 | 131 | 2 | 1.3 | 4.8 |
| Example 17 | Production Example 2-6 | 129 | 2 | 1.3 | 4.3 |

TABLE 9

| | | Impact resistance Izod impact resistance (J/m) 23° C. | | | | | | | Impact resistance at low temperature: Ductility-brittleness | | | |
|---|---|---|---|---|---|---|---|---|---|---|---|---|
| | | Just after molding | | | | | | | After weather resistance test | | transition temperature (° C.) | |
| | Modifier | Composition 1 | Composition 2 | Composition 3 | Composition 4 | Composition 5 | Composition 6 | Composition 7 | Composition 1 | Composition 2 | Composition 1 | Composition 2 |
| Example 18 | Production Example 3-1 | 930 | 780 | 270 | 730 | 780 | 800 | 50 | 810 | 740 | −32 | −39 |
| Example 19 | Production Example 3-2 | 950 | 780 | 320 | 730 | 810 | 820 | 60 | 810 | 740 | −30 | −39 |
| Example 20 | Production Example 3-3 | 900 | 780 | 270 | 730 | 800 | 780 | 50 | 810 | 740 | −30 | −40 |
| Example 21 | Production Example 3-4 | 910 | 780 | 280 | 730 | 800 | 790 | 45 | 810 | 740 | −30 | −39 |
| Example 22 | Production Example 3-5 | 950 | 780 | 330 | 730 | 820 | 820 | 65 | 810 | 740 | −32 | −43 |
| Example 23 | Production Example 3-6 | 980 | 780 | 340 | 730 | 810 | 810 | 60 | 810 | 740 | −32 | −43 |
| Example 24 | Production Example 3-7 | 970 | 780 | 340 | 730 | 820 | 800 | 55 | 810 | 740 | −30 | −38 |
| Example 25 | Production Example 3-8 | 970 | 780 | 400 | 730 | 820 | 820 | 60 | 810 | 740 | −32 | −39 |
| Example 26 | Production Example 3-9 | 920 | 780 | 280 | 730 | 760 | 780 | 50 | 810 | 740 | −30 | −38 |
| Example 27 | Production Example 3-10 | 950 | 780 | 320 | 730 | 760 | 820 | 55 | 810 | 740 | −30 | −39 |
| Example 28 | Production Example 3-11 | 920 | 780 | 270 | 730 | 760 | 800 | 50 | 810 | 740 | −30 | −39 |
| Comparative Example 1 | Production Example C1 | 650 | 520 | 150 | 550 | 500 | 600 | 30 | 550 | 580 | −7 | −21 |
| Comparative Example 2 | Production Example C2 | 620 | 560 | 140 | — | — | — | — | — | — | — | — |
| Comparative Example 3 | Production Example C3 | 720 | 610 | 250 | — | — | — | — | — | — | — | — |
| Comparative Example 4 | MBS | 930 | 700 | 230 | 720 | 720 | 780 | 50 | 180 | 190 | −22 | −43 |

| | Modifier | Heat transformation resistance (HDT) (° C.) Composition 2 | Difference of MFR between before and after of heat resistance test in humid atmosphere (g/10 min) Composition 2 | Difference of YI value between before and after of heat discoloration test (ΔYI) Composition 2 | Coloringability (ebonyty) L* Composition 1 |
|---|---|---|---|---|---|
| Example 18 | Production Example 3-1 | 126 | 1.5 | 1.1 | 5.7 |
| Example 19 | Production Example 3-2 | 129 | 2 | 1.2 | 5.6 |
| Example 20 | Production Example 3-3 | 128 | 2 | 1.1 | 5.2 |
| Example 21 | Production Example 3-4 | 129 | 1.5 | 1.2 | 5.2 |
| Example 22 | Production Example 3-5 | 130 | 2 | 1.1 | 5.8 |
| Example 23 | Production Example 3-6 | 129 | 2 | 1.2 | 6.1 |
| Example 24 | Production Example 3-7 | 130 | 2 | 1.1 | 5.8 |
| Example 25 | Production Example 3-8 | 130 | 1.5 | 1.2 | 5.1 |
| Example 26 | Production Example 3-9 | 131 | 2 | 1.2 | 5.4 |

TABLE 9-continued

| | | | | | |
|---|---|---|---|---|---|
| Example 27 | Production Example 3-10 | 129 | 1.5 | 1.3 | 5.4 |
| Example 28 | Production Example 3-11 | 129 | 1.5 | 1.3 | 5.4 |
| Comparative Example 1 | Production Example C1 | 122 | 5 | 3.2 | 14.5 |
| Comparative Example 2 | Production Example C2 | — | 4.8 | 3.1 | 13.5 |
| Comparative Example 3 | Production Example C3 | — | 3.4 | 2.9 | 14 |
| Comparative Example 4 | MBS | 124 | 6 | 6 | 5 |

In the Table 9, the abbreviation of the modifier means a resin shown as follows.

MBS: MBS resin (Metablen C-223A, manufactured by Mitsubishi Rayon Co., Ltd.)

EXAMPLES 29 TO 34 AND COMPARATIVE EXAMPLES 5 to 7

Flame Retardancy

Using the obtained pellets, test pieces having 1.6 mm thickness were produced by injection molding. And burning time and drippingablity in burning of each of the test pieces were evaluated as the flame retardancy by the vertical combustion test (UL94V) defined in UL94 which is one of the standards of Underwriter's Laboratories (UL). The evaluated compositions and the results were shown in the Table 10. The conditions to prepare the test pieces such as molding condition were based on the above-mentioned methods.

TABLE 10

| | | Graft copolymer | | Resin (parts) | | | PTFE (parts) | Flame retardant (aid) (parts) | | | | |
|---|---|---|---|---|---|---|---|---|---|---|---|---|
| | Composition No. | Production Example | parts | PC | ABS | SAN | F201L | CR 741 | FG 7500 | PATOX-M | Bayowet | XC-99 |
| Example 29 | 7 | 2-3 | 5 | 100 | | | 0.3 | | | | 0.05 | 1 |
| Example 30 | 8 | 3-2 | 5 | 100 | | | 0.3 | | | | 0.05 | 1 |
| Comparative Example 5 | 9 | C1 | 5 | 100 | | | 0.3 | | | | 0.05 | 1 |
| Example 31 | 10 | 2-5 | 5 | 85 | | 15 | 0.3 | 14 | 7 | | | |
| Example 32 | 11 | 3-7 | 5 | 85 | | 15 | 0.3 | 14 | 7 | | | |
| Comparative Example 6 | 12 | C1 | 5 | 85 | | 15 | 0.3 | 14 | 7 | | | |
| Example 33 | 13 | 2-6 | 5 | 75 | 11 | 14 | 0.3 | 12 | | | | |
| Example 34 | 14 | 3-9 | 5 | 75 | 11 | 14 | 0.3 | 12 | | | | |
| Comparative Example 7 | 15 | C1 | 5 | 75 | 11 | 14 | 0.3 | 12 | | | | |

| | Composition No. | Impact resistance Izod | | Flame retardancy |
|---|---|---|---|---|
| | | Measurement temperature | J/m | Combustion test UL-94V |
| Example 29 | 7 | −20 | 580 | V-2 |
| Example 30 | 8 | −20 | 620 | V-2 |
| Comparative Example 5 | 9 | −20 | 180 | V-2 |
| Example 31 | 10 | 0 | 440 | V-2 |
| Example 32 | 11 | 0 | 500 | V-2 |
| Comparative Example 6 | 12 | 0 | 150 | V-2 |
| Example 33 | 13 | −10 | 600 | V-1 |
| Example 34 | 14 | −10 | 650 | V-1 |
| Comparative Example 7 | 15 | −10 | 250 | V-1 |

In the Table 10, the abbreviations of the thermoplastic resins mean resins shown as follows.

CR741: complex phosphate manufactured by Daihachi Chemical Industriy Co., Ltd. (CR741)

FG7500: tetrabromo bisphenol-A carbonate oligomer manufactured by Teijin Chemicals Ltd. (FG7500)

PATOX-M: antimony trioxide manufactured by Nihon Seiko Co., Ltd. (PATOX-M)

Bayowet C4: organic metal salt compound containing fluorine atoms manufactured by Bayer AG (Bayowet)

XC99-B5664: Silicone oil (Mw=61000) manufactured by GE Toshiba Silicones Company (XC-99)

F201 L: polytetrafluoroethylene manufactured by Daikin Industries, Ltd. (F201 L)

EXAMPLES 35 to 38 AND COMPARATIVE EXAMPLES 8 to 10

Examples of fiber-reinforced resins containing glass fibers (GF) are shown below. The modifiers added in the resins are shown in Table 11. The Izod impact resistance of each of the resins was evaluated as a performance test. The result was shown in the Table 11.

TABLE 11

|  | Graft copolymer | | Fiber reinforced resin (parts) | | | Izod impact resistance |
|---|---|---|---|---|---|---|
|  | Production Example | parts | RFPET | RFPBT | RFPA | J/m |
| Example 35 | 3-2 | 10 | 100 |  |  | 105 |
| Comparative Example 8 | C1 | 10 | 100 |  |  | 65 |
| Example 36 | 3-7 | 10 |  | 100 |  | 120 |
| Comparative Example 9 | C1 | 10 |  | 100 |  | 81 |
| Example 37 | 2-6 | 10 |  |  | 100 | 400 |
| Example 38 | 3-9 | 10 |  |  | 100 | 520 |
| Comparative Example 10 | C1 | 10 |  |  | 100 | 200 |

In the Table 11, the abbreviations of the fiber-reinforced resins mean resins shown as follows.

RFP ET: GF reinforced polyethylene terephthalate resin, NOVADU RN 501G15 manufactured by Mitsubishi Engineering-Plastics Corporation RFPBT: GF reinforced polybutylene terephthalate resin, TUFPET 1030 manufactured by Mitsubishi Rayon Co., Ltd.

RFPA: GF reinforced polyamide resin, NOVAMID 1015G33 manufactured by Mitsubishi Engineering-Plastics Corporation

EXAMPLES 39 TO 40 AND COMPARATIVE EXAMPLE 11

Examples of thermoplastic resins comprising vinyl chloride resins and graft copolymers are shown in Table 12. Using the below-mentioned composition, a rolled-sheet of flat plate having a width of 100 cm, a length of 100 cm, and a thickness of 3 mm were obtained, then it was press-molded, and test pieces for evaluations of physical properties were cut out. Items of the evaluations were the Izod impact resistance, puncture impact resistance, and color. Using samples based on the ASTM D256 obtained by cutting out from the flat plate, the Izod impact resistances were measured. To measure the puncture impact resistance, a high-speed puncture impact testing instrument (Hydro Shot, manufactured by SHIMADZU CORPORATION) was used. The conditions of the measurement were as follows.

Velocity of dropping weight: 3.3 m/sec
Diameter of the top of a punch: ½ inchs
Bore of receiving area of a sample: 3 inchs
Sample: an injection-molded plate having a width of 100 cm, a length of 100 cm, n=5
Temperature: 23° C.

When the plate was cracked, it was regarded as brittleness. And when the plate was holed by the punch and wasn't cracked as a whole, it was regarded as ductility. The ductility is better. The color of each of the sample was evaluated by visual inspection. When it looked black, it was regarded as ○. When it looked whiter, it was regarded as X. When it looked medium between the ○ and the ×, it was regarded as Δ. The samples of the ○ were evaluated as good color. The used composition is shown as follows.

| | |
|---|---|
| Vinyl chloride resin (polymerization degree: 1100) | 100 parts |
| Dibasic lead phosphite | 2.5 parts |
| Dibasic lead stearate | 0.7 parts |
| Lead stearate | 0.5 parts |
| Calcium stearate | 0.9 parts |
| Polyethylene wax (molecular weight: 2200) | 0.1 parts |
| Calcium carbonate | 5.0 parts |
| Processing aid (Metablen P-501) | 1.0 parts |
| Carbon black | 0.5 parts |
| Modifier | 7.5 parts |

TABLE 12

| | Graft copolymer | | Izod impact resistance | Puncture impact test | Color |
|---|---|---|---|---|---|
| | Production Example | parts | (J/m) 23° C. | 23° C. | Visual inspection |
| Example 39 | 2-4 | 7.5 | 700 | Ductility | ○ |
| Example 40 | 3-9 | 7.5 | 850 | Ductility | ○ |
| Comparative Example 11 | C1 | 7.5 | 210 | Brittleness | X |

As shown in each of the Tables, each of the thermoplastic resin compositions of the examples containing the impact modifiers of the present invention had excellent impact resistance and each of the appearance came from the color-ingability was also excellent. The degradation of their impact strength after the weather resistance test was little, and they had excellent weather resistance. When the impact modifiers were applied to the fiber-reinforced resins, they showed excellent mechanical properties.

On the other hand, as in comparative examples, when the impact modifiers (C1, C2, and C3) which didn't form particles having each of 80 wt % or more of them has a particle diameter within the range of 400 to 1,000 nm as determined from a particle diameter distribution on a weight basis were used, the coloringability of each of them were poor, and the impact resistance of C1 and C2 were somewhat lower.

When the rubber which constituted the impact modifier was the composite rubber comprising, as principal components, the acrylic rubber (A1) component containing at least one of a (meth)acrylate of an alcohol having a branched side chain or an alcohol having an alkyl group with 13 or more carbon atoms as a constituent component, and the acrylic rubber (A2) component containing n-butyl acrylate as a constituent component, and when the glass transition temperature (Tg1) came from the acrylic rubber (A1) component was lower than the glass transition temperature (Tg2) came from the acrylic rubber (A2) component, more excellent impact resistance were shown. When the MBS resin was used as the impact modifier, the impact strength after the weather resistance test was degraded. As shown in the Table 5, the present invention provided excellent impact resistance without degrading the flame retardationability and the impact modifiers of the present invention were shown to be effective for the flame retardation uses.

As shown in the Table 10, the impact modifiers of the present invention provided excellent impact resistances for the components of reinforced plastic.

As explained above, the impact modifier of the present invention improves the impact resistance of resins by adding a small amount of it, and it maintains 10 weather resistance, pigment coloringability, heat resistance in humid atmosphere, and heat transformation resistance of the obtained molded articles very well, and which doesn't cause poor flame retardationability to them when many kinds of flame retardants are added for flame retardation uses. The excellent impact modifier can be produced easily and preferably by the process for producing the impact modifier of the present invention. And the thermoplastic resin composition of the present invention is the composition having excellent above-mentioned properties and is the resin which is useful in various fields.

The invention claimed is:

1. An impact modifier which comprises a graft copolymer comprising:
    a rubber polymer (A) obtained from a mixture comprising one or more kinds of (meth)acrylic monomers and having a glass transition temperature of 0° C. or lower and being in the form of particles where 80 wt % or more of them has a particle diameter within the range of 400 to 1,000 nm and wherein the particles exhibit a peak position in which a group from 510-610 nm is heaviest as determined from a particle diameter distribution on a weight basis; and
    branches (B) grafted thereto obtained from one or more kinds of vinyl monomers.

2. The impact modifier according to claim 1, wherein one or more kinds of monomer units which are derived from vinyl monomers having one or more functional groups selected from the group consisting of epoxy group, hydroxyl group, and isobornyl group are components of the rubber polymer (A) and/or the branches (B).

3. The impact modifier according to claim 1, further comprising inorganic filler (C).

4. The impact modifier according to claim 1, wherein the rubber polymer (A) includes a composite rubber comprising an acrylic rubber (A1) component containing at least one of a (meth)acrylate of an alcohol having a branched side chain or an alcohol having an alkyl group with 13 or more carbon atoms as a constituent component, and an acrylic rubber (A2) component containing n-butyl acrylate as a constituent component, and wherein the glass transition temperature (Tg1) comes from the acrylic rubber (A1) component is lower than the glass transition temperature (Tg2) comes from the acrylic rubber (A2) component.

5. The impact modifier according to claim 4, wherein the acrylic rubber (A1) component comprises one or more kinds of compounds selected from the group consisting of 2-ethylhexyl acrylate, ethoxyethyl acrylate, methoxytripropylene glycol acrylate, 4-hydroxybutyl acrylate, tridecyl methacrylate, stearyl methacrylate, and stearyl acrylate.

6. The impact modifier according to claim 1, wherein d=d85-d15 of the rubber polymer (A) is 180 nm or less when the rubber polymer (A) comprises particles and each of 80 wt % or more of them has a particle diameter within the range of 400 to 1,000 nm based on a particle diameter distribution on a weight basis measured by Capillary Hydro Dynamic Flow Fractionation, and when difference between the diameter correspond to 85% of cumulative distribution from the smallest particle diameter on a weight basis (d85) and the diameter correspond to 15% of it (d15) is defined as d.

7. The impact modifier according to claim 1, wherein the heaviest group of the rubber polymer (A) in the groups having peak values of diameter within the range of 400 to 1,000 nm forms 70% by weight or more of the gross weight of the particles having diameter within the range of 400 to 1,000 nm when the particle diameter distribution of the rubber polymer (A) is measured by Capillary Hydro Dynamic Flow Fractionation.

8. The impact modifier according to claim 4, wherein the composite rubber comprising the acrylic rubber (A1) component which is within a range from 5 to 95% by weight and the acrylic rubber (A2) component which is within a range from 95 to 5% by weight.

9. The impact modifier according to claim 1, wherein the heaviest group of the rubber polymer (A) in the groups having peak values of diameter within the range of 400 to 1,000 nm forms 90% by weight or more of the gross weight of the particles which is measured by Capillary Hydro Dynamic Flow Fractionation.

10. The impact modifier according to claim 1, wherein the rubber polymer (A) comprising units come from monomers having two or more unsaturated bonds which is within a range of 2% by weight or less.

11. The impact modifier according to claim 1, wherein the branches (B) is obtained by multi-stage polymerization.

12. The impact modifier according to claim 1, wherein the branches (B) comprises units come from monomers which work as crosslinking agents and/or graft cross agents.

13. The impact modifier according to claim 1, further comprising compound (R) having a sulfonic acid group, sulfosuccinic acid group, or a sulfuric acid group, or a salt of compound (R).

14. The impact modifier according to claim 13, wherein the compound (R) or the salt has one or more phenyl skeletons.

15. The impact modifier according to claim 13, wherein the compound (R) or the salt is used as emulsifiers for the emulsion polymerization to produce the graft copolymer.

16. The impact modifier according to claim 15, further comprising carbonic acid-type emulsifier used as emulsifiers for the polymerization to produce the graft copolymer.

17. The impact modifier according to claim 1, further comprising a compound having one or more structures which are selected from the group consisting of mercapto group, sulfuric acid group, ammonium group, and calcium atom.

18. The impact modifier according to claim 1, wherein the rubber polymer (A) is obtained by seed polymerization.

19. A process for producing the impact modifier of claim 1, wherein there are two or more processes of polymerization for the rubber polymer (A).

20. A process for producing the impact modifier of claim 4, wherein the (A1) component is produced by a process of polymerization after a forced emulsification treatment process.

21. The process for producing the impact modifier according to claim 20, wherein there are two or more processes of polymerization to produce the (A1) component.

22. The process for producing the impact modifier according to claim 20, wherein all of raw materials which constitute the (A2) component are added to the (A1) component at the same time and these are polymerized after catalysts are added.

23. The process for producing the impact modifier according to claim 19, wherein calcium salt is used as a coagulating agent when the obtained graft copolymer is collected as powder by wet coagulation.

24. The process for producing the impact modifier according to claim 19, wherein the impact modifier is collected as powder by spray-drying.

25. A thermoplastic resin composition comprising a thermoplastic resin and the impact modifier of claim 1.

26. The thermoplastic resin composition according to claim 25, wherein the thermoplastic resin comprising one or more kinds of resins selected from the group consisting of polycarbonate resin, polyester resin, styrene resin, acrylic resin, polyamide resin, and vinyl chloride resin.

27. The thermoplastic resin composition according to claim 25, wherein the thermoplastic resin comprising one or more kinds of resins selected from the group consisting of polycarbonate resin, polyester resin, and ABS resin.

28. The thermoplastic resin composition according to claim 25, further comprising fibered reinforcements.

29. The thermoplastic resin composition according to claim 25, further comprising flame retardants.

30. The thermoplastic resin composition according to claim 29, wherein the flame retardants are halogen flame retardants, phosphoric acid flame retardants, or silicone flame retardants.

31. The thermoplastic resin composition according to claim 29, wherein the flame retardants are organic metal salt compounds containing halogen atoms.

* * * * *